United States Patent
Kawasaki et al.

(10) Patent No.: US 7,288,333 B2
(45) Date of Patent: Oct. 30, 2007

(54) MAGNETIC FILM AND THIN FILM MAGNETIC HEAD USING THIS MAGNETIC FILM

(75) Inventors: Mitsuo Kawasaki, Niigata-ken (JP); Hisayuki Yazawa, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/659,119

(22) Filed: Sep. 10, 2003

(65) Prior Publication Data
US 2004/0053077 A1 Mar. 18, 2004

(30) Foreign Application Priority Data
Sep. 12, 2002 (JP) .............................. 2002-266305
May 12, 2003 (JP) .............................. 2003-133447

(51) Int. Cl.
*G11B 5/31* (2006.01)
*G11B 5/127* (2006.01)

(52) U.S. Cl. .................... 428/812; 428/815.2; 428/816; 428/692.1; 428/693.1; 360/110; 360/125; 360/126; 360/127

(58) Field of Classification Search ..................... None
See application file for complete search history.

(56) References Cited

U.S. PATENT DOCUMENTS

| | | | |
|---|---|---|---|
| 6,034,847 A * | 3/2000 | Komuro et al. | 360/126 |
| 6,063,512 A * | 5/2000 | Osaka et al. | 428/812 |
| 6,132,892 A * | 10/2000 | Yoshikawa et al. | 428/812 |
| 6,252,749 B1 | 6/2001 | Hayakawa | |
| 6,369,984 B1 | 4/2002 | Sato | |
| 6,574,854 B1 * | 6/2003 | Moran | 29/603.15 |
| 7,116,527 B1 * | 10/2006 | Fukuzawa et al. | 360/322 |
| 2002/0009616 A1 * | 1/2002 | Kamiguchi et al. | 428/692 |

(Continued)

FOREIGN PATENT DOCUMENTS

JP          62-226413 A     * 10/1987

(Continued)

OTHER PUBLICATIONS

Derwent Abstract Translation of JP 62-226413-A (Derwent Acc. No. 1987-317786).*

(Continued)

*Primary Examiner*—Kevin M. Bernatz
(74) *Attorney, Agent, or Firm*—Brinks Hofer Gilson & Lione

(57) ABSTRACT

A soft magnetic film of the present invention is a plated film composed of Co and Fe, and columnar crystals extending in the film thickness direction are provided. In the present invention, columnar crystals extending in the film thickness direction are provided so that an improvement in the surface roughness of the film surface and an improvement in the corrosion resistance can be achieved. Furthermore, the saturation magnetic flux density Bs can also be improved by making the crystal fine and eliminating the need for addition of the noble metal element. That is, according to a CoFe alloy of the present invention, both the corrosion resistance and the saturation magnetic flux density Bs can be improved, and specifically, the above-mentioned saturation magnetic flux density Bs can be increased to 2.35 T or more.

18 Claims, 17 Drawing Sheets

U.S. PATENT DOCUMENTS

| | | | |
|---|---|---|---|
| 2002/0060879 A1 | 5/2002 | Sato | |
| 2002/0106533 A1* | 8/2002 | Kudo et al. | 428/692 |
| 2003/0048582 A1* | 3/2003 | Kanada et al. | 360/126 |
| 2003/0151851 A1* | 8/2003 | Sato et al. | 360/126 |
| 2003/0197982 A1* | 10/2003 | Funayama et al. | 360/321 |
| 2003/0206369 A1* | 11/2003 | Sasaki et al. | 360/126 |
| 2004/0080868 A1* | 4/2004 | Yamaguchi et al. | 360/126 |
| 2005/0011590 A1* | 1/2005 | Kawasaki et al. | 148/311 |

FOREIGN PATENT DOCUMENTS

| | | |
|---|---|---|
| JP | 4-235288 | 8/1992 |
| JP | 5-335146 | 12/1993 |
| JP | 6-49680 | 2/1994 |
| JP | 6-96949 | 4/1994 |
| JP | 6-251978 | 9/1994 |
| JP | 7-57934 | 3/1995 |
| JP | 7-233494 | 9/1995 |
| JP | 8-97034 | 4/1996 |
| JP | 11-154310 | 6/1999 |
| JP | 2000-100622 | 4/2000 |
| JP | 2002-57031 | 2/2002 |
| JP | 3298930 | 4/2002 |
| JP | 2002-134318 | 5/2002 |
| JP | 2002-217029 | 8/2002 |
| RU | 2 149 927 | 5/2000 |
| WO | WO 85/04677 | 9/1982 |

OTHER PUBLICATIONS

JPO Abstract Translation of JP 2003-077723.*

Liu et al. (IEEE Trans. Mag., 36(5), 2000, 3479-3481).*

*Pulse Plating of cobalt-iron-copper alloys*, P.E. Bradley, B. Janossy and D. Landolt, Journal of Applied Electrochemistry, 31, (2001), pp. 137-144.

*Electrodeposition of highly functional thin films for magnetic recording devices of the next century*, Tetsuya Osaka, Electrochimica Acta, 45, (2000) [published on Jun. 23, 2000], pp. 3311-3321.

Reason for Refusal of JP Patent Appln. No. 2003-133447 dated Oct. 17, 2006 with translation, 8 pages.

* cited by examiner

SATURATION MAGNETIC FLUX DENSITY Bs

COERCIVE FORCE

SPECIFIC RESISTANCE

FILM STRESS

CRYSTAL PARTICLE DIAMETER

CENTER LINE AVERAGE ROUGHNESS Ra

CRYSTAL PARTICLE DIAMETER

SATURATION MAGNETIC FLUX DENSITY Bs

MAGNETIC FILM AND THIN FILM MAGNETIC HEAD USING THIS MAGNETIC FILM

BACKGROUND OF THE INVENTION

1. Field of the Invention

The present invention relates to a magnetic film used as, for example, a magnetic pole portion of a recording inductive head. In particular, the present invention relates to a magnetic film which is composed of Co and Fe, which contains no impurity, and which can improve both the saturation magnetic flux density and the corrosion resistance by microcrystallization, a thin film magnetic head using this magnetic film, a method for manufacturing the above-mentioned magnetic film and a method for manufacturing the above-mentioned thin film magnetic head.

2. Description of the Related Art

In particular, in order to match a future increase in packing density, a magnetic material having a high saturation magnetic flux density Bs must be used for components such as a core layer of a thin film magnetic head, and thereby, magnetic fluxes must be concentrated in the vicinity of the gap of the above-mentioned core layer to improve the packing density.

Conventionally, alloys containing Co and Fe have been frequently used for the above-mentioned magnetic material. Such materials are described, for example, in the following Japanese patents and published patent applications.

Japanese Patent No. 3298930

Japanese Unexamined Patent Application Publication No. 7-57934

[Patent literature 3]

Japanese Unexamined Patent Application Publication No. 7-233494

[Patent literature 4]

Japanese Unexamined Patent Application Publication No. 2002-134318

[Patent literature 5]

Japanese Unexamined Patent Application Publication No. 2002-217029

When a magnetic material containing Co and Fe is formed by plating, in general, sodium saccharin ($C_6H_4CONNaSO_2$) is added to the plating bath as a brightener (refer to, for example, Patent literature 2 and Patent literature 4). When sodium saccharin is added to a plating bath, however, S (sulfur) an impurity, in the sodium saccharin mixes with Fe and corrosion is likely to occur. Furthermore, increased concentrations of trivalent Fe ions and $Fe(OH)_3$ in the plating bath reduce the saturation magnetic flux density Bs when Fe ions from these compounds are taken into a plated film. In order to reduce corrosion of the above-mentioned magnetic material, a noble metal that is unlikely to be ionized can be added to the plating bath so as to form a $CoFe\alpha$ ($\alpha$ represents, for example, Rh) alloy. The $CoFe\alpha$ alloy reduces the corrosion described above compared with the case where no noble metal element $\alpha$ is added. On the other hand, the saturation magnetic flux density Bs is reduced an available saturation magnetic flux density on the order of 2.2 T.

A saturation magnetic flux density Bs on the order of 2.4 T can potentially be produced in a bulk material composed of Co and Fe. Therefore, it is desired that a saturation magnetic flux density Bs of 2.4 T or close to this value be achieved through a plating process. However, it was conventionally difficult to form the magnetic material containing Co and Fe by plating, while creating a magnetic material having a high saturation magnetic flux density Bs and high corrosion resistance.

SUMMARY OF THE INVENTION

The present invention is to overcome the above-mentioned problems. In particular, it is an object of the present invention to provide a magnetic film which is composed of Co and Fe, which contains no impurity, e.g. S (sulfur) and which can improve both the saturation magnetic flux density and the corrosion resistance by microcrystallization, a thin film magnetic head using this magnetic film, a method for manufacturing the above-mentioned magnetic film and a method for manufacturing the above-mentioned thin film magnetic head.

A magnetic film of the present invention is a plated film composed of elements of Co and Fe and is provided to include a columnar crystal extending in the film thickness direction.

The magnetic film of the present invention is a plated film composed of Co and Fe, and impurities, e.g. S (sulfur), and noble metal elements, e.g. Rh, are not contained in this plated film in contrast to a conventional plated film. With respect to the magnetic film of the present invention, as described below, malonic acid is added to a plating bath. In a magnetic film thereby formed by plating, crystals were made fine, and surface roughness of the film surface was improved. In the magnetic film formed by plating while malonic acid was added to the plating bath, as in the present invention, columnar crystals extending in the film thickness direction were formed. On the other hand, in the magnetic film resulting from no addition of malonic acid, the above-mentioned columnar crystal was not formed. The above-mentioned columnar crystal may be formed by piling up of a plurality of fine crystals, or be a lump of a single crystal. However, it is believed that the columnar crystal is preferably formed by piling up of a plurality of fine crystals, and thereby, an increase in saturation magnetic flux density Bs and reduction in coercive force Hc can be accelerated in addition to an improvement in the corrosion resistance.

In the present invention, an improvement in the corrosion resistance is not performed by addition of the noble metal to the CoFe alloy in contrast to a conventional manner. A columnar crystal extending in the film thickness direction is formed, and thereby, an improvement in the surface roughness of the film surface and an improvement in the corrosion resistance can be achieved. Furthermore, the saturation magnetic flux density Bs can also be improved by making the crystal fine and eliminating the need for addition of the noble metal element. With respect to the saturation magnetic flux density, since the above-mentioned magnetic film is formed by plating while Fe ions are primarily in the state of $Fe^{2+}$, as described below, further improvement in the saturation magnetic flux density Bs can be achieved. Specifically, in the present invention, the saturation magnetic flux density of 2.35 T or more can be achieved.

In the present invention, preferably, a plurality of the above-mentioned columnar crystals are provided side by side in the film surface direction with grain boundaries extending in the film thickness direction therebetween in order that the surface roughness of the film surface is reduced, an improvement in the corrosion resistance can thereby be achieved, and furthermore, the saturation magnetic flux density is improved.

In the present invention, preferably, the compositional ratio of the above-mentioned Fe is 50% by mass or more, but 85% by mass or less. According to the experimental results described below, the saturation magnetic flux density can thereby be increased to 2.2 T or more.

In the present invention, more preferably, the compositional ratio of the above-mentioned Fe is 50% by mass or more, but 81.5% by mass or less. According to the experimental results described below, the saturation magnetic flux density can thereby be increased to 2.25 T or more.

In the present invention, most preferably, the compositional ratio of the above-mentioned Fe is 60% by mass or more, but 72% by mass or less. According to the experimental results described below, the saturation magnetic flux density can thereby be increased to 2.35 T or more.

In the present invention, preferably, the average crystal particle diameter of the above-mentioned magnetic film is 200 angstroms or less. Preferably, the center line average roughness Ra of the film surface of the above-mentioned magnetic film is 2.5 nm or less. In the magnetic film of the present invention, as described above, the average crystal particle diameter and the center line average roughness Ra of the film surface can be reduced. As a result, an improvement in the corrosion resistance, an improvement in the saturation magnetic flux density Bs, and reduction in the coercive force Hc can be appropriately achieved.

A thin film magnetic head of the present invention includes a lower core layer, an upper core layer and a magnetic pole portion which is located between the above-mentioned lower core layer and upper core layer and which has the width dimension in the track-width direction controlled to be smaller than that of the above-mentioned lower core layer and upper core layer, wherein the above-mentioned magnetic pole portion is composed of a lower magnetic pole layer succeeding the lower core layer, an upper magnetic pole layer succeeding the upper core layer and a gap layer located between the above-mentioned lower magnetic pole layer and the above-mentioned upper magnetic pole layer, or the above-mentioned magnetic pole portion is composed of an upper magnetic pole layer succeeding the upper core layer and a gap layer located between the above-mentioned upper magnetic pole layer and the lower core layer, and wherein the above-mentioned upper magnetic pole layer and/or the lower magnetic pole layer is any one of the above-mentioned plated films, which is composed of elements of Co and Fe and which is provided to include a columnar crystal extending in the film thickness direction.

In the above-mentioned thin film magnetic head, the magnetic pole portion for controlling the track width is provide between the lower core layer and the upper core layer, and the magnetic film of the present invention can be used for this magnetic pole portion. The above-mentioned magnetic pole portion has a structure composed of, for example, the upper magnetic pole layer, the lower magnetic pole layer and the gap layer sandwiched therebetween, and signals are written into a medium through the recording magnetic field leaking from the upper and lower magnetic pole layers. Consequently, it is better that the saturation magnetic flux density Bs of the above-mentioned magnetic pole layer is higher. By using the magnetic film of the present invention for the above-mentioned magnetic pole layer, a thin film magnetic head capable of appropriately matching an increase in packing density can be formed. Furthermore, since the surface roughness of the film surface of the above-mentioned magnetic pole layer is small, the above-mentioned gap layer can be easily formed into a predetermined shape on the flattened lower magnetic pole layer, and as a result, a thin film magnetic head having excellent recording characteristics can be manufactured.

A method for manufacturing a magnetic film of the present invention includes the steps of adding malonic acid to a plating bath containing Fe ions and Co ions and forming a magnetic film by plating, while the soft magnetic film is composed of elements of Co and Fe and includes columnar crystals extending in the film thickness direction.

Malonic acid ($HO-OCCH_2COOH$) is a complexing agent. When the above-mentioned malonic acid is added to the plating bath, $Fe^{3+}$ in the plating bath forms a complex compound with the above-mentioned malonic acid, and this is unlikely to be taken into a plated film. On the other hand, $Fe^{2+}$ is likely to be taken into a plated film formed by plating together with Co ions. Consequently, it is believed that the magnetic film is formed by plating while $Fe^{2+}$ is primarily taken therein during formation. In the present invention, an improvement in the corrosion resistance of the above-mentioned magnetic film is achieved by addition of malonic acid to the plating bath, and therefore, impurities, such as S (sulfur), which conventionally cause corrosion are not mixed into the plating bath.

As a result of the above-mentioned addition of malonic acid to the plating bath, degradation of the above-mentioned plating bath can be reduced than ever. Since the above-mentioned malonic acid is added, crystal in the magnetic film formed by plating can be made fine, deposition of $Fe^{3+}$ in the above-mentioned magnetic film can be reduced. Consequently, the manufacturing method of the present invention can improve both of the corrosion resistance and the saturation magnetic flux density Bs of the above-mentioned magnetic film.

In the present invention, preferably, the above-mentioned magnetic film is formed by plating through an electroplating method with pulsed current. In the electroplating method with pulsed current, for example, by repeating ON/OFF of a current-controlling element, times in which current is passed and blank times in which no current is passed are provided during formation of the plating. When the times in which no current is passed are provided, as described above, an effect of agitating the plating solution is enhanced, and the content of Fe contained in the magnetic film can be increased. Furthermore, a CoFe alloy film is formed little by little by plating, and thereby, uneven distribution of the current density during formation of the plating can be reduced compared with that in an electroplating method with direct current. According to the electroplating method with pulsed current, crystals in the state of fine columnar crystals can be deposited in the film surface direction with grain boundaries therebetween in the above-mentioned magnetic film, microcrystallization of the crystals constituting the above-mentioned columnar crystals can be accelerated, and the surface roughness can be appropriately controlled compared with that in an electroplating method with direct current.

In the present invention, preferably, the above-mentioned malonic acid is added to the plating bath within the range of 0.03 g/l or more, but 0.25 g/l or less. More preferably, the above-mentioned malonic acid is added to the plating bath within the range of 0.03 g/l or more, but 0.05 g/l or less.

In this manner, microcrystallization in the magnetic film formed by plating can be accelerated, the surface roughness can be effectively reduced, the saturation magnetic flux density Bs can be improved, and in addition, the coercive force Hc can be reduced.

A method for manufacturing a thin film magnetic head of the present invention, the thin film magnetic head including a lower core layer, an upper core layer and a magnetic pole portion which is located between the lower core layer and the upper core layer and which has the width dimension in the track-width direction controlled to be smaller than that of the lower core layer and the upper core layer, includes the steps of forming the above-mentioned magnetic pole portion from a lower magnetic pole layer succeeding the lower core layer, an upper magnetic pole layer succeeding the upper core layer and a gap layer located between the above-mentioned lower magnetic pole layer and the above-mentioned upper magnetic pole layer, or forming the above-mentioned magnetic pole portion from an upper magnetic pole layer succeeding the upper core layer and a gap layer located between the above-mentioned upper magnetic pole layer and lower core layer, and forming, at this time, the above-mentioned upper magnetic pole layer and/or the above-mentioned lower magnetic pole layer by plating using the magnetic film manufactured by any one of the above-mentioned method.

Since the above-mentioned upper magnetic pole layer and/or lower magnetic pole layer is formed by plating using the above-mentioned method for manufacturing a magnetic film, a magnetic pole layer having excellent corrosion resistance and a high saturation magnetic flux density Bs can be formed with a high yield.

DESCRIPTION OF THE PREFERRED EMBODIMENTS

Figure 1:
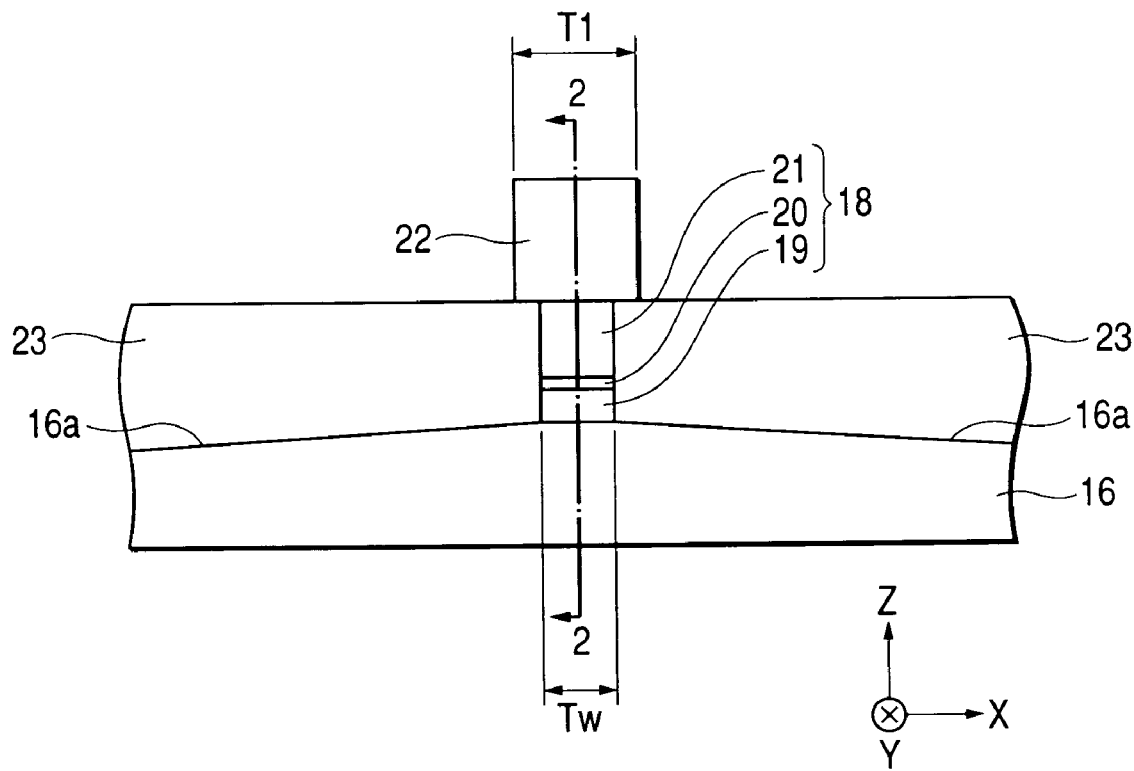
FIG. 1 is a partial front view of a thin film magnetic head according to a first embodiment of the present invention.
Figure 2:
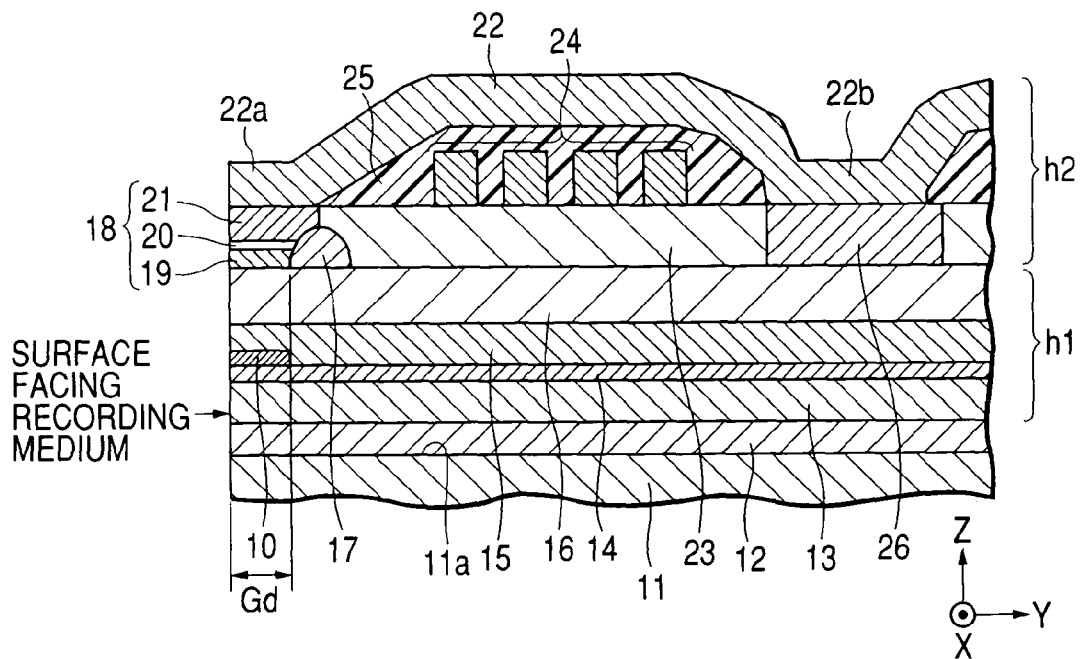
FIG. 2 is a vertical sectional view of the portion shown in FIG. 1.

FIG. 1 is a partial front view of a thin film magnetic head according to the first embodiment of the present invention. FIG. 2 is a vertical sectional view of the thin film magnetic head shown in FIG. 1, cut along the line 2-2 and viewed from the direction indicated by arrows.

The thin film magnetic head of the present invention is formed on a trailing-side end surface 11a of a ceramic slider 11 constituting a flying head, and is an MR/inductive composite thin film magnetic head (hereafter simply referred to as thin film magnetic head) in which an MR head h1 and a writing inductive head h2 are laminated. The MR head h1 detects a leakage magnetic field from a recording medium, for example, a hard disk, through the use of a magnetoresistance effect, and reads a recorded signal.

As shown in FIG. 2, a lower shield layer 13 made of a magnetic material composed of NiFe or the like is provided on a trailing-side end surface 11a of the slider 11 with an $Al_2O_3$ film 12 therebetween, and a lower gap layer 14 made of an insulating material is further provided on the lower shield layer 13.

A magnetoresistive element 10, for example, an anisotropic magnetoresistive (AMR) element, a giant magnetoresistive (GMR) element or a tunneling magnetoresistive (TMR) element, is provided on the lower gap layer 14 from a surface facing a recording medium toward the height direction (the Y direction shown in the drawing). An upper gap layer 15 made of an insulating material is further provided on the magnetoresistive element 10 and the lower gap layer 14. An upper shield layer 16 made of a magnetic material, for example, NiFe, is further provided on the upper gap layer 15. The MR head h1 is composed of laminated films from the above-mentioned lower shield layer 13 to the upper shield layer 16.

In the embodiment shown in FIGS. 1 and 2, the upper shield layer 16 doubles as the lower core layer of the inductive head h2, a Gd-determining layer 17 is provided on the lower core layer 16, and a gap depth (Gd) is controlled by the length dimension from the surface facing the recording medium to the end portion of the Gd-determining layer 17. The Gd-determining layer 17 is formed from, for example, an organic insulating material.

As shown in FIG. 1, the top surface 16a of the lower core layer 16 is formed from inclined surfaces which are inclined downward in a direction farther from the base end of a magnetic pole portion 18 toward the track-width direction (the X direction shown in the drawing), and thereby, occurrence of side fringing can be reduced.

As shown in FIG. 2, the magnetic pole portion 18 is provided from the surface facing the recording medium to the midpoint on the Gd-determining layer 17.

In the magnetic pole portion 18, a lower magnetic pole layer 19, a non-magnetic gap layer 20 and an upper magnetic pole layer 21 are sequentially laminated from the bottom.

The lower magnetic pole layer 19 is provided directly on the lower core layer 16 by plating Preferably, the gap layer 20 provided on the lower magnetic pole layer 19 is made of a non-magnetic, metallic material which can be provided by plating. Specifically, the material is preferably at least one selected from the group consisting of NiP, NiPd, NiW, NiMo, Au, Pt, Rh, Pd, Ru and Cr.

As a specific embodiment in the present invention, NiP is used for the gap layer 20. This is because the gap layer 20 can be appropriately brought into a non-magnetic state when the gap layer 20 is formed from NiP.

Furthermore, the upper magnetic pole layer 21 provided on the above-mentioned gap layer 20 is magnetically connected to an upper core layer 22 provided thereon.

When the gap layer 20 is formed from a non-magnetic, metallic material which can be provided by plating, as described above, the lower magnetic pole layer 19, the gap layer 20 and the upper magnetic pole layer 21 can be successively formed by plating. The magnetic pole portion 18 may be composed of two layers including the gap layer 20 and the upper magnetic pole layer 21.

As shown in FIG. 1, the magnetic pole portion 18 is formed to have its width dimension in the track-width direction (the X direction shown in the drawing) of a track width Tw.

As shown in FIG. 1 and FIG. 2, an insulating layer 23 is provided on both sides in the track-width direction (the X direction shown in the drawing) and the rear side in the height direction (the Y direction shown in the drawing) of the magnetic pole portion 18. The top surface of the insulating layer 23 is adjusted to be flush with the top surface of the magnetic pole portion 18.

As shown in FIG. 2, a helical coil layer 24 is provided by patterning on the insulating layer 23. The coil layer 24 is covered with an insulating layer 25 made of an organic insulating material. The upper core layer 22 is provided over the magnetic pole portion 18 and the insulating layer 25 by patterning through, for example, a frame plating method. As shown in FIG. 1, the front end 22a of the upper core layer 22 is provided to have a width dimension of T1 in the track-width direction on the surface facing the recording medium, and the width dimension T1 is adjusted to be larger than the track width Tw.

As shown in FIG. 2, the base end 22b of the upper core layer 22 is directly connected onto a junction layer (back gap layer) 26 made of a magnetic material, which is formed on the lower core layer 16.

In the present invention, the upper magnetic pole layer 21 and/or lower magnetic pole layer 19 (hereafter referred to as magnetic pole layers 19 and 21) are formed from a plated film composed of elements of Co and Fe. In contrast to conventional plated films impurities, for example, S (sulfur), and noble metal elements, for example, Rh, are not contained in this plated film.

The magnetic pole layers 19 and 21 are formed by plating using a plating bath containing, for example, malonic acid, and thereby, the surface roughness of the film surface of the magnetic pole layers 19 and 21 is reduced because fine crystals are formed.

In the magnetic pole layers 19 and 21 formed by plating while malonic acid is added to the plating bath, columnar crystals extending in the film thickness direction (the Z direction shown in the drawing) are formed. On the other hand, if the magnetic pole layers 19 and 21 are formed by plating without the addition of malonic acid to the plating bath, columnar crystals are not formed.

The columnar crystals formed in the magnetic pole layers 19 and 21 may be formed by the piling up of a plurality of fine crystals, or by lumps of single crystals. However, the columnar crystals are preferably formed by the piling up of a plurality of fine crystals, and thereby, an increase in saturation magnetic flux density Bs and reduction in coercive force Hc can be accelerated in addition to an improvement in the corrosion resistance.

Although not intending the invention to be bound to a particular theory, it is believed that the reason for the formation of the columnar crystals in the magnetic pole layers 19 and 21 is believed related to microcrystallization that is accelerated by the addition of malonic acid to the plating bath. Fine crystals epitaxially grow in the plating bath.

Preferably, the crystal structure of the magnetic pole layers 19 and 21 composed of elements of Co and Fe is a body-centered cubic structure (bcc). It is believed that the (110) plane of the above-mentioned columnar crystal exhibits preferred orientation in the direction parallel to the film surface (plane parallel to the X-Y plane shown in the drawing), or the columnar crystal is substantially in random orientation state.

In the magnetic pole layers 19 and 21, fine crystals constitute the columnar crystals, and in addition, the magnetic pole layers 19 and 21 are formed by plating while Fe ions are primarily in the state of $Fe^{2+}$. In prior art plating processes Fe ions contained in the plating bath are likely to become trivalent Fe ions or $Fe(OH)_3$ because of oxidation of divalent Fe ions. When these ions are taken into a soft magnetic film together with Co ions, the saturation magnetic flux density Bs of the soft magnetic film is reduced. However, in the magnetic pole layers 19 and 21 shown in FIG. 1 and FIG. 2, as described above, Fe ions are formed by plating primarily in the $Fe^{2+}$ oxidation state, and therefore, the saturation magnetic flux densities Bs of the magnetic pole layers 19 and 21 can be further improved. In accordance with the invention, since a complexing agent, for example, malonic acid, is added to the plating bath, $Fe^{2+}$ is easily taken into the magnetic pole layers 19 and 21, as described above.

In order to improve the saturation magnetic flux density Bs, it is also important to appropriately adjust the amount of Fe in the magnetic pole layers 19 and 21. According to the experimental results described below, it is clear that when the amount of Fe is within the range of 50% to 85% by weight, the saturation magnetic flux density is able to be increased to 2.2 T or more. Further, when the amount of Fe was within the range of 50% to 81.5% by weight, the saturation magnetic flux density was able to be increased to 2.25 T or more. Also, when the amount of Fe is within the range of 60% to 72% by weight, the saturation magnetic flux density is increased to 2.35 T or more.

The saturation magnetic flux density Bs of the bulk material formed from a CoFe alloy is in the order of 2.4 T. Therefore, approximately adjusting the amount of Fe, the saturation magnetic flux densities Bs of the magnetic pole layers 19 and 21 shown in FIG. 1 and FIG. 2 can be brought very close to the saturation magnetic flux density Bs of the bulk material.

In the magnetic pole layers 19 and 21, a plurality of the above-mentioned columnar crystals are preferably formed, and the columnar crystals are formed side by side with grain boundaries extending in the film surface direction. More preferably, these columnar crystals are formed throughout the film, with grain boundaries extending in the film surface direction. The good crystalline state of the magnetic pole layers 19 and 21 relates to the accelerated microcrystallization in the magnetic pole layers. Consequently, the surface roughness of the pole layers 19 and 21 can be further reduced, and further improvement in the saturation magnetic flux density Bs and further reduction in the coercive force Hc can be achieved.

The magnetic pole layers 19 and 21 are microcrystallized to have small average crystal particle diameters, such that the average crystal particle diameters of the magnetic pole layers 19 and 21 are reduced to 200 angstroms or less. Furthermore, the crystals in the magnetic pole layers 19 and 21 are microcrystallized to have columnar crystals. Accordingly, the surface roughness can be reduced, and the center line average roughness Ra of the magnetic pole layers 19 and 21 can be reduced to 2.5 nm or less.

With respect to the magnetic characteristics other than the saturation magnetic flux density Bs, the coercive force Hc can be reduced to 1,185 (A/m) (=15 Oe) or less, and the specific resistance of 20 ($\mu\Omega\cdot$cm) or more can be achieved. Further, the film stress, is reduced, in particular, when the amount of Fe is adjusted to be within the range of 60% to 72% by weight. Specifically, the film stress is reduced to 1,000 MPa or less, and preferably, to 600 MPa or less.

In the present invention, it is important that the magnetic pole layers 19 and 21 have particularly high saturation magnetic flux densities. However, it is also preferable that the film stress is appropriately small value.

The lower magnetic pole layer 19 and the upper magnetic pole layer 21 constituting the magnetic pole portion 18 have very reduced film thicknesses (on the order of 0.3 μm with respect to the lower magnetic pole layer 19 and in the range of 0.3 to 0.5 μm with respect to the upper magnetic pole layer 21) and very small width dimensions in the track-width direction. Since the above-mentioned magnetic pole layers 19 and 21 are formed in a very small region, as described above, it is believed that even when the film stress is somewhat high, the recording characteristics are not adversely affected. However, in particular, it is preferable that the film stress is low in order to optimize the manufacturing method. Consequently, in the present invention, the compositional ratio is preferably adjusted in order to have a film stress within the range in which the manufacturing process is not adversely affected.

In the present invention, since the surface roughness of the film surface of the lower magnetic pole layer 19 is small, the gap layer 20 on the lower magnetic pole layer 19 can be formed on a flattened surface. In this manner, the gap layer 20 can be formed into the shape of a predetermined rectangle in the direction parallel to the track-width direction (the X direction shown in the drawing). Also, the conventional curved shape of the gap layer 20 due to roughness of the film surface of the lower magnetic pole layer 19 is improved. Accordingly, a thin film magnetic head having excellent recording characteristics can be formed.

As described above, the magnetic pole layers 19 and 21 shown in FIG. 1 and FIG. 2 are plated films composed of elements of Co and Fe, and are provided to include columnar crystals extending in the film thickness direction. Consequently, both of the corrosion resistance and the saturation magnetic flux density Bs of the magnetic pole layers 19 and 21 is improved.

Figure 3:
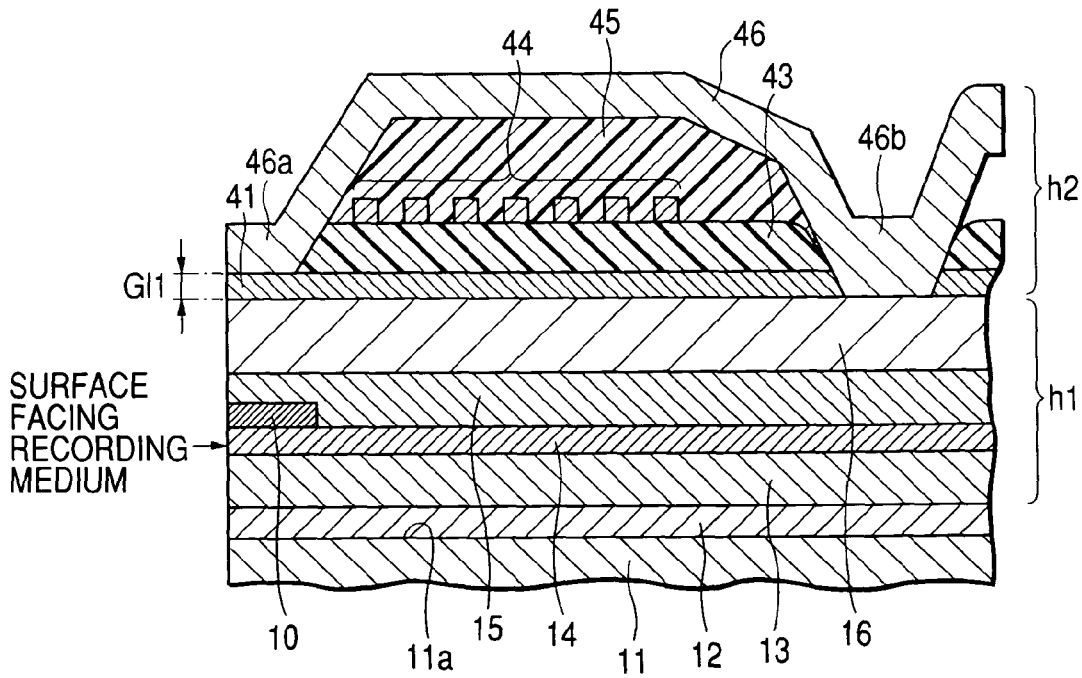
FIG. 3 is a vertical sectional view of a thin film magnetic head according to a second embodiment of the present invention.

FIG. 3 is a vertical sectional view of a thin film magnetic head according to the second embodiment of the present invention. In this embodiment, an MR head h1 is the same as that shown in FIG. 1. As shown in FIG. 3, a magnetic gap layer (non-magnetic material layer) 41 made of alumina or the like is provided on a lower core layer 16. A coil layer 44 is provided on the magnetic gap layer 41 with an insulating layer 43 made of polyimide or a resist material therebetween by patterning to have a two-dimensionally helical shape. The coil layer 44 is formed from a non-magnetic conductive material, for example Cu (copper), having a small electrical resistance.

Furthermore, the coil layer 44 is surrounded by an insulating layer 45 formed from polyimide or a resist material, and an upper core layer 46, made of a soft magnetic material, is provided on the insulating layer 45.

As shown in FIG. 3, on the surface facing a recording medium, the front end 46a of the upper core layer 46 faces onto the lower core layer 16 with the magnetic gap layer 41 therebetween. The magnetic gap having a magnetic gap length of Gl1 is provided on the lower core layer 16. The base end 46b of the upper core layer 46 is magnetically connected to the lower core layer 16, as shown in FIG. 3.

In a manner similar to that in the magnetic pole layers 19 and 21 described with reference to FIG. 1 and FIG. 2, the lower core layer 16 and/or the upper core layer 46 (hereafter referred to as core layers 16 and 46) shown in FIG. 3 are plated films composed of elements of Co and Fe, and include columnar crystals extending in the film thickness direction. The core layers 16 and 46 result in improvement of both the corrosion resistance and the saturation magnetic flux density Bs.

A method for forming the magnetic pole layers 19 and 21 shown in FIG. 1 and FIG. 2 by plating will be described below.

A plating bath for forming the above-mentioned magnetic pole layers 19 and 21 by plating contains Co ions and Fe ions, and malonic acid (HO—OCCH$_2$COOH) is also added thereto. The malonic acid is a complexing agent. When malonic acid is added to the plating bath, Fe$^{3+}$ in the plating bath forms a complex compound with the malonic acid, and this complex is unlikely to be taken into a plated film.

On the other hand, Fe$^{2+}$ in the plating bath is likely to be taken into formation regions of the magnetic pole layers 19 and 21 together with Co ions. Consequently, it is believed that the magnetic pole layers 19 and 21 are formed while Fe$^{2+}$ is primarily taken into the magnetic pole layer.

Boric acid (H$_3$BO$_3$) and NaCl, which act as pH buffers of the electrode surface, are added to the plating bath. However, sodium saccharin (C$_6$H$_4$CONNaSO$_2$) and the like is not added because this compound typically contains impurities such as S (sulfur), which conventionally cause corrosion. Likewise, compounds containing noble metal element, for example Rh, which is conventionally added to improve the corrosion resistance are also not added.

As a result of the addition of malonic acid to the plating bath, degradation of the plating bath can be reduced. When the malonic acid is added, with respect to the magnetic pole layers 19 and 21, fine crystals are epitaxially piled up in the film thickness direction during plating. Consequently, columnar crystals extending in the film thickness direction are formed in the magnetic pole layers 19 and 21. Further, Fe$^{3+}$ in the magnetic pole layers 19 and 21 can be reduced, and magnetic pole layers 19 and 21 are formed without impurities, such as S (sulfur), and a noble metal element, other than Co and Fe.

Preferably, the magnetic pole layers 19 and 21 are formed by plating through an electroplating method with pulsed current. In the electroplating method, for example, by repeatedly switching a current-controlling element on and off, times in which current is passed and blank times in which no current is passed are created during the plating process. When the current is switched off, the magnetic pole layers 19 and 21 are slowly plated, and the concentration of Fe ions in the plating bath is increased. Accordingly, current density can be reduced during the plating process as compared to conventional electroplating with direct current.

With respect to the pulsed current, preferably, the ON/OFF cycle is repeated, for example, every few seconds, and the duty ratio is adjusted to be in the range of 0.1 to 0.5. The pulsed current affects the average crystal particle diameter of the CoFe alloy and the center line average roughness Ra of the film surface.

As described above, since the electroplating method with pulsed current can reduce the uneven distribution of the current density during the formation of the plating, crystals in the magnetic pole layers 19 and 21 can be made very fine. Also, a plurality of columnar crystals can be more easily formed in the film surface direction with grain boundaries extending in the film thickness direction as compared with conventional direct current electroplating. Preferably, the columnar crystals are formed throughout the film, and in addition, the content of Fe in the magnetic pole layers 19 and 21 is increased.

When the pulsed current electroplating method is adopted, there is more flexibility in adjustment of the compositional ratio as compared with conventional direct current electroplating. Consequently, the amount of Fe in the magnetic pole layers 19 and 21 can be easily adjusted within the range of 50% to 85% by weight, more preferably, within the range of 50% to 81.5% by weight, and most preferably, within the range of 60% to 72% by weight.

As described above, fine crystals are formed in the magnetic pole layers 19 and 21 by plating in a plating bath containing malonic acid, and columnar crystals extending in the film thickness direction are formed in the magnetic pole layers 19 and 21. In particular, since the electroplating method with pulsed current is adopted, further microcrystallization and an increase in the amount of Fe contained in the magnetic pole layers 19 and 21 are accelerated. As a result, the magnetic pole layers 19 and 21 having improved corrosion resistance as well as a high saturation magnetic flux density Bs can be easily formed.

In the formation of the magnetic pole layers 19 and 21 by plating, even when the direct current electroplating method is used, columnar crystals extending in the film thickness direction can be formed in the magnetic pole layers 19 and 21. However, when the pulsed current electroplating method is used, crystals are likely to be made fine because of a reduction in the film stress and a reduction in the plating rate. Accordingly, further improvement in the corrosion resistance and an increase in the saturation magnetic flux density Bs can be achieved.

Preferably, malonic acid is added to the plating bath within the range of 0.03 g/l to 0.25 g/l, and more preferably, malonic acid is added to the plating bath within the range of 0.03 g/l to 0.05 g/l.

According to the experimental results described below, by adjusting the amount of malonic acid to be within the range described above, microcrystallization in the magnetic pole layers 19 and 21 can be accelerated, fine columnar crystals can be deposited over a wider range in the film, the surface roughness of the film surface can be effectively reduced, the saturation magnetic flux density Bs can be improved, and in addition, the coercive force Hc can be reduced.

The upper core layer 46 and/or lower core layer 16 shown in FIG. 3 can also be formed by plating using the plating bath containing malonic acid described above.

In the present invention, oxalic acid (HOOC—COOH), succinic acid (HOOC—(CH$_2$)$_2$—COOH), maleic acid (HOOC—CH=CH—COOH) or tartaric acid (HOOC—(CHOH)$_2$—COOH) may be added instead of malonic acid. Even when these reagents are used, columnar crystals extending in the film thickness direction are formed in a soft magnetic film made of CoFe, and a soft magnetic film having a high saturation magnetic flux density Bs of 2.2 T or more can be produced.

In the present embodiment, although not limited to any particular functional element, the thin film magnetic heads shown in FIG. 1 to FIG. 3 are fabricated from the soft magnetic film made of elements of Co and Fe. For example, flat-type magnetic elements, such as thin film inductors, and the like can also be fabricated from the soft magnetic film made of elements of Co and Fe described above.

EXAMPLES

In the present embodiment, a CoFe alloy was formed by plating using a plating bath described below through an electroplating method. At this time, the relationship between the compositional ratio of the CoFe alloy and soft magnetic characteristics as well as film characteristics were examined. The plating bath conditions and film forming conditions with respect to Example 1 and Example 2 (CoFe alloys formed by plating using a plating bath containing malonic acid, but without saccharin), Comparative example 1 (alloys containing Co and Fe formed by plating using a plating bath containing saccharin), Comparative example 2 (alloys containing Co and Fe formed by plating using a plating bath without saccharin) and Comparative example 3 (a CoFeRh alloy) are shown in Table 1

TABLE 1

| | Composition [mass %] | | | | Fe ion [g/l] | Co ion [g/l] | Fe/Co | Malonic acid [g/l] | Saccharin [g/l] | Current Duty density ratio [mA/cm²] | pH | Temp | $4\pi Ns$ [T] | Hch [Oe] | Cryst. particle dia. [Å] | Surface roughness [nm] | Film stress [MPa] | Sp. resistance [$\mu\Omega$ cm] |
|---|---|---|---|---|---|---|---|---|---|---|---|---|---|---|---|---|---|---|
| | Fe | Co | Ni | Rh | | | | | | | | | | | | | | |
| Comp. ex. 1 | 59.9 | 40.1 | — | — | 4.02 | 4.12 | 0.95 | — | | | | | 2.2 | 23.8 | 358 | 21.8 | 83 | 23.4 |
| | 63.8 | 36.3 | — | — | 4.02 | 3.43 | 1.14 | — | | | | | 2.2 | 18.5 | 308 | 14.1 | 208 | 27.0 |
| | 66.8 | 33.2 | — | — | 4.02 | 2.97 | 1.31 | — | | | | | 2.2 | 17.0 | | 9.4 | 222 | 27.3 |
| | 68.6 | 31.4 | — | — | 1.23 | 0.57 | 2.08 | — | | | | | 2.3 | 17.2 | 212 | 8.1 | 327 | 26.1 |
| | 70.8 | 29.2 | — | — | 1.23 | 0.69 | 1.74 | — | | | | | 2.3 | 15.8 | 301 | 7.3 | 318 | 28.6 |
| | 71.0 | 29.1 | — | — | 1.23 | 0.57 | 2.08 | — | | | | | 2.3 | 15.2 | 276 | 6.6 | 329 | 27.4 |
| | 71.4 | 28.7 | — | — | 1.23 | 0.57 | 2.08 | — | | | | | 2.3 | 14.3 | 264 | 6.3 | 313 | 26.9 |
| | 71.4 | 28.8 | — | — | 1.23 | 0.57 | 2.08 | — | | | | | 2.2 | 14.3 | 277 | 8.1 | 365 | 26.5 |
| | 71.7 | 28.3 | — | — | 1.23 | 0.57 | 2.08 | — | | | | | 2.2 | 15.4 | 266 | 6.6 | 328 | 27.9 |
| | 71.7 | 28.3 | — | — | 1.23 | 0.57 | 2.08 | — | | | | | 2.2 | 18.6 | 267 | 4.5 | 382 | 27.3 |
| | 71.8 | 28.2 | — | — | 1.23 | 0.57 | 2.08 | — | | | | | 2.3 | 14.7 | 277 | 6.0 | 386 | 27.2 |
| | 72.3 | 27.7 | — | — | 1.23 | 0.57 | 2.08 | — | | | | | 2.2 | 18.3 | 233 | 6.2 | 341 | 26.8 |
| | 72.8 | 27.2 | — | — | 1.23 | 0.57 | 2.08 | — | | | | | 2.3 | 15.8 | 301 | 4.2 | 356 | 27.2 |
| | 72.9 | 27.1 | — | — | 1.23 | 0.57 | 2.08 | — | | | | | 2.3 | 15.6 | 286 | 4.6 | 355 | 27.6 |
| | 73.0 | 27.1 | — | — | 1.23 | 0.57 | 2.08 | — | | | | | 2.3 | 18.8 | 280 | 3.9 | 382 | 27.0 |
| | 73.7 | 26.3 | — | — | 1.23 | 0.57 | 2.08 | — | | | | | 2.3 | 15.8 | 308 | 5.3 | 385 | 26.3 |
| | 79.5 | 20.5 | — | — | 4.02 | 1.60 | 2.44 | — | | | | | 2.2 | 16.2 | 326 | 10.6 | 291 | 31.7 |
| | 83.0 | 17.0 | — | — | 4.02 | 1.26 | 3.11 | — | | | | | 2.2 | 14.2 | | 10.1 | 319 | 31.4 |
| | 85.8 | 14.2 | — | — | 4.02 | 0.91 | 4.27 | — | | | | | 2.1 | 13.5 | 334 | 6.9 | 328 | 31.9 |
| | 90.2 | 9.8 | — | — | 4.02 | 0.57 | 6.83 | — | | | | | 2.1 | 13.0 | | 13.0 | 315 | 32.7 |
| | 93.6 | 6.4 | — | — | 4.02 | 0.34 | 11.39 | — | | | | | 2.0 | 14.9 | 334 | 10.4 | 315 | 30.5 |
| | 97.4 | 2.6 | — | — | 4.02 | 0.11 | 34.17 | — | | | | | 2.0 | 18.2 | | 18.3 | 311 | 23.5 |
| | 99.4 | 0.6 | — | — | 4.02 | 0.00 | ∞ | — | | | | | 1.9 | 25.5 | | 12.2 | 258 | 28.9 |
| Comp. ex. 2 | 70.6 | 29.4 | — | — | 2.01 | 0.94 | 2.13 | — | — | | | | 2.33 | 10.0 | | 4.9 | 864 | 23.1 |
| | 72.9 | 27.1 | — | — | 2.01 | 0.94 | 2.13 | — | — | | | | 2.32 | 9.8 | | 12.2 | 842 | 24.7 |
| | 66.8 | 33.2 | — | — | 2.01 | 0.94 | 2.13 | — | — | | | | 2.33 | 16.2 | | 5.0 | 782 | 19.7 |
| | 65.9 | 33.1 | — | — | 2.01 | 0.94 | 2.13 | — | — | | | | 2.30 | 12.3 | | 23.1 | 694 | 19.7 |
| | 65.6 | 34.4 | — | — | 2.01 | 0.94 | 2.13 | — | — | | | | 2.29 | 14.4 | | 4.7 | 595 | 19.1 |
| | 70.0 | 30.1 | — | — | 2.01 | 0.94 | 2.13 | — | — | | | | 2.33 | 15.1 | | 7.5 | 629 | 22.5 |
| | 64.7 | 35.3 | — | — | 3.82 | 0.94 | 4.05 | — | — | | | | 2.30 | 18.0 | 210 | 1.4 | 149 | 18.2 |
| | 68.6 | 31.4 | — | — | 4.62 | 0.94 | 4.90 | — | — | | | | 2.32 | 14.3 | | 1.0 | 148 | 20.6 |
| | 69.2 | 30.8 | — | — | 5.22 | 0.94 | 5.54 | — | — | | | | 2.34 | 15.3 | | 1.5 | 166 | 21.7 |
| | 65.9 | 34.1 | — | — | 5.22 | 0.94 | 5.54 | — | — | | | | 2.29 | 23.6 | 180 | 1.7 | 102 | 19.0 |
| | 68.6 | 31.5 | — | — | 6.03 | 0.94 | 6.39 | — | — | | | | 2.32 | 19.5 | | 1.6 | 69 | 20.9 |
| | 69.0 | 31.0 | — | — | 6.03 | 0.94 | 6.39 | — | — | | | | 2.31 | 20.1 | | 1.8 | 78 | 21.4 |
| | 67.8 | 32.3 | — | — | 6.23 | 0.94 | 6.60 | — | — | | | | 2.32 | 26.4 | 173 | 2.1 | 60 | 20.4 |
| | 69.7 | 30.3 | — | — | 7.20 | 0.94 | 7.63 | — | — | | | | 2.26 | | 244 | 1.8 | 53 | 21.9 |
| | 73.8 | 26.2 | — | — | 3.42 | 0.52 | 6.52 | — | — | | | | 2.30 | 19.2 | | 1.8 | 182 | 26.6 |
| | 79.7 | 20.3 | — | — | 5.42 | 0.52 | 10.35 | — | — | | | | 2.26 | 17.8 | | 2.1 | 224 | 32.7 |
| | 79.9 | 20.1 | — | — | 5.42 | 0.52 | 10.35 | — | — | | | | 2.23 | 17.8 | | 2.8 | 253 | 33.2 |
| | 82.0 | 18.0 | — | — | 5.42 | 0.52 | 10.35 | — | — | | | | 2.16 | 17.2 | 220 | 5.5 | 294 | 33.8 |
| | 75.1 | 25.0 | — | — | 6.43 | 0.52 | 12.27 | — | — | | | | 2.23 | | 225 | 1.9 | 220 | 29.4 |
| | 78.3 | 21.7 | — | — | 7.43 | 0.52 | 14.18 | — | — | | | | 2.23 | 20.8 | 230 | 2.6 | 194 | 32.4 |
| | 79.3 | 20.7 | — | — | 2.01 | 0.21 | 9.58 | — | — | | | | 2.25 | 14.4 | | 1.6 | 132 | 32.7 |
| | 80.6 | 19.4 | — | — | 2.51 | 0.21 | 12.46 | — | — | | | | 2.19 | 14.2 | | 1.7 | 163 | 33.5 |
| | 84.0 | 16.0 | — | — | 4.02 | 0.23 | 17.42 | — | — | | | | 2.14 | 14.4 | | 1.7 | 154 | 34.7 |
| | 83.5 | 16.6 | — | — | 4.02 | 0.24 | 16.96 | — | — | | | | 2.15 | 16.2 | | 1.2 | 96 | 34.1 |
| | 79.9 | 20.2 | — | — | 2.01 | 0.63 | 3.19 | — | — | | | | 2.22 | 17.8 | | 3.5 | 338 | 32.7 |
| | 66.4 | 33.6 | — | — | 2.01 | 0.63 | 3.19 | — | — | | | | 2.35 | 21.4 | | 0.9 | 390 | 20.2 |
| | 64.1 | 35.9 | — | — | 2.01 | 0.63 | 3.19 | — | — | | | | 2.28 | 24.7 | | 2.4 | 248 | 18.4 |
| | 68.2 | 31.8 | — | — | 2.01 | 0.63 | 3.19 | — | — | | | | 2.32 | 20.7 | | 1.6 | 287 | 20.5 |
| | 70.3 | 29.7 | — | — | 2.01 | 0.63 | 3.19 | — | — | | | | 2.35 | 17.4 | | 1.9 | 415 | 22.8 |
| | 64.7 | 35.3 | — | — | 2.01 | 0.63 | 3.19 | — | — | | | | 2.30 | 25.0 | | 2.0 | 217 | 18.3 |
| | 62.7 | 37.3 | — | — | 2.01 | 0.63 | 3.19 | — | — | | | | 2.28 | 28.7 | | 2.0 | 217 | |
| | 67.0 | 33.0 | — | — | 2.01 | 0.94 | 2.13 | — | — | | | | 2.35 | 13.4 | | 6.2 | 681 | 19.7 |
| | 66.3 | 33.7 | — | — | 2.01 | 1.15 | 1.74 | — | — | | | | 2.33 | 12.2 | | 7.7 | 767 | 19.1 |
| | 63.1 | 37.0 | — | — | 2.01 | 1.36 | 1.47 | — | — | | | | 2.31 | 12.7 | | 1.8 | 951 | 17.7 |
| | 65.9 | 34.2 | — | — | 2.01 | 1.36 | 1.47 | — | — | | | | 2.30 | 13.6 | | 2.6 | 1005 | |
| | 62.7 | 37.3 | — | — | 2.01 | 1.36 | 1.47 | — | — | | | | 2.27 | 12.5 | | 2.9 | 1124 | 17.5 |
| | 64.7 | 35.3 | — | — | 2.01 | 1.36 | 1.47 | — | — | | | | 2.31 | 12.0 | | 2.1 | 1028 | 18.2 |
| | 63.3 | 36.8 | — | — | 2.01 | 1.36 | 1.47 | — | — | | | | 2.29 | 13.2 | | 2.6 | 1037 | 17.5 |
| | 65.4 | 34.8 | — | — | 2.01 | 1.36 | 1.47 | — | — | | | | 2.31 | 13.0 | | 1.5 | 898 | 18.5 |

TABLE 1-continued

| | Composition [mass %] | | | | Fe ion [g/l] | Co ion [g/l] | Fe/Co | Malonic acid [g/l] | Saccharin [g/l] | Current density [mA/cm²] | Duty ratio | pH | Temp | 4πNs [T] | Hch [Oe] | Cryst. particle dia. [Å] | Surface roughness [nm] | Film stress [MPa] | Sp. resistance [μΩ cm] |
|---|---|---|---|---|---|---|---|---|---|---|---|---|---|---|---|---|---|---|---|
| | Fe | Co | Ni | Rh | | | | | | | | | | | | | | | |
| | 64.2 | 35.8 | — | — | 2.01 | 1.36 | 1.47 | — | — | | | | | 2.32 | 13.2 | | 2.1 | 918 | 18.1 |
| | 59.7 | 40.3 | — | — | 2.01 | 1.36 | 1.47 | — | — | | | | | 2.26 | 21.8 | 227 | 1.2 | 537 | 17.1 |
| | 66.9 | 33.1 | — | — | 2.41 | 1.36 | 1.77 | — | — | | | | | 2.32 | 17.8 | | 1.5 | 738 | 19.4 |
| | 71.7 | 28.3 | — | — | 3.01 | 1.36 | 2.21 | — | — | | | | | 2.32 | 17.2 | | 2.8 | 619 | 24.1 |
| | 69.8 | 30.2 | — | — | 2.01 | 1.36 | 1.47 | — | — | | | | | 2.33 | 10.1 | | 3.9 | 902 | 22.0 |
| | 54.4 | 45.6 | — | — | 2.01 | 1.26 | 1.60 | — | — | | | | | 2.15 | 56.7 | | 1.1 | 239 | 16.3 |
| | 70.5 | 29.5 | — | — | 2.01 | 1.26 | 1.60 | — | — | | | | | 2.34 | 15.5 | | 3.0 | 902 | 22.3 |
| | 70.1 | 29.9 | — | — | 2.01 | 1.26 | 1.60 | — | — | | | | | 2.34 | 13.4 | | 2.8 | 945 | 22.5 |
| | 70.0 | 30.0 | — | — | 2.01 | 1.26 | 1.60 | — | — | | | | | 2.34 | 14.3 | | 2.9 | 909 | 22.1 |
| | 59.8 | 40.2 | — | — | 1.21 | 1.26 | 0.96 | — | — | | | | | 2.27 | 17.8 | | 6.7 | 810 | 17.1 |
| | 59.8 | 40.2 | — | — | 1.21 | 1.26 | 0.96 | — | — | | | | | 2.27 | 17.3 | | 2.5 | 878 | 17.1 |
| | 56.3 | 43.7 | — | — | 1.21 | 1.26 | 0.96 | — | — | | | | | 2.20 | 16.6 | | 1.0 | 1110 | 16.5 |
| | 63.0 | 37.0 | — | — | 1.61 | 1.26 | 1.28 | — | — | | | | | 2.27 | 15.4 | | 1.5 | 1175 | 17.5 |
| | 64.2 | 35.8 | — | — | 1.61 | 1.26 | 1.28 | — | — | | | | | 2.30 | 17.7 | | 1.4 | 1120 | 18.0 |
| Ex. 1 | 70.1 | 29.9 | — | — | 1.00 | 0.52 | 1.92 | 0.03 | — | 25.7 | 0.3 | 2.2 | 30 | 2.37 | 12.0 | | 1.1 | 926 | 24.4 |
| | 60.8 | 39.3 | — | — | 1.00 | 0.52 | 1.92 | 0.03 | — | 12.8 | 0.3 | 2.2 | 30 | 2.37 | | | 1.5 | | |
| | 67.2 | 32.8 | — | — | 1.00 | 0.52 | 1.92 | 0.03 | — | 12.8 | 0.3 | 2.5 | 30 | 2.35 | | 180 | 1.0 | 706 | |
| | 51.0 | 49.0 | — | — | 1.00 | 0.52 | 1.92 | 0.03 | — | 8.3 | 0.3 | 2.5 | 30 | 2.25 | 16.5 | | 1.5 | 650 | 20.0 |
| | 66.4 | 33.6 | — | — | 1.00 | 0.52 | 1.92 | 0.03 | — | 25.7 | 0.3 | 2.5 | 30 | | | | 3.7 | 811 | 23.0 |
| | 66.6 | 33.4 | — | — | 1.00 | 0.52 | 1.92 | 0.03 | — | 19.3 | 0.3 | 2.2 | 30 | 2.37 | 10.7 | | 1.4 | 748 | |
| | 62.0 | 38.0 | — | — | 1.00 | 0.52 | 1.92 | 0.03 | — | 19.3 | 0.3 | 2.2 | 30 | | | | 2.2 | 395 | |
| | 61.3 | 38.7 | — | — | 1.00 | 0.52 | 1.92 | 0.05 | — | 15.4 | 0.3 | 2.2 | 30 | 2.36 | 10.4 | | 1.5 | 508 | 22.3 |
| | 65.8 | 34.2 | — | — | 1.00 | 0.52 | 1.92 | 0.05 | — | 15.4 | 0.3 | 2.2 | 30 | 2.36 | 9.2 | | 1.2 | 923 | 26.1 |
| | 65.4 | 34.6 | — | — | 1.00 | 0.52 | 1.92 | 0.05 | — | 19.3 | DC | 2.2 | 30 | | 10.5 | | 0.8 | 1245 | 28.4 |
| | 67.0 | 33.0 | — | — | 1.00 | 0.52 | 1.92 | 0.05 | — | 14.1 | DC | 2.2 | 30 | | 11.2 | | 0.9 | 1294 | 30.6 |
| | 69.7 | 30.3 | — | — | 1.00 | 0.52 | 1.92 | 0.03 | — | 25.7 | 0.3 | 2.1 | 30 | 2.35 | 8.7 | | 0.6 | 820 | 23.1 |
| | 69.0 | 31.0 | — | — | 1.00 | 0.52 | 1.92 | 0.05 | — | 25.7 | 0.3 | 2.1 | 30 | 2.37 | 9.0 | 150 | 0.5 | 950 | 24.8 |
| Ex. 2 | 45.9 | 54.1 | — | — | 0.40 | 0.52 | 0.77 | 0.05 | — | 25.7 | 0.3 | 2.4 | 30 | | 22.3 | | 1.4 | 920 | 12.9 |
| | 52.7 | 47.4 | — | — | 0.50 | 0.52 | 0.96 | 0.05 | — | 25.7 | 0.3 | 2.4 | 30 | 2.29 | 22.5 | | 1.5 | 1034 | 14.8 |
| | 57.2 | 42.9 | — | — | 0.60 | 0.52 | 1.15 | 0.05 | — | 25.7 | 0.3 | 2.4 | 30 | 2.33 | 20.5 | | 1.4 | 1130 | 18.0 |
| | 67.1 | 32.9 | — | — | 0.90 | 0.52 | 1.72 | 0.05 | — | 25.7 | 0.3 | 2.4 | 30 | 2.36 | 15.4 | | 1.8 | 1238 | 24.5 |
| | 70.1 | 29.8 | — | — | 1.00 | 0.52 | 1.92 | 0.05 | — | 25.7 | 0.3 | 2.4 | 30 | 2.36 | 9.8 | | 0.7 | 1271 | 26.9 |
| | 70.9 | 29.1 | — | — | 1.00 | 0.52 | 1.92 | 0.05 | — | 25.7 | 0.3 | 2.4 | 30 | | | 249 | 1.1 | | |
| | 71.2 | 28.8 | — | — | 1.00 | 0.52 | 1.92 | 0.03 | — | 25.7 | 0.3 | 2.4 | 30 | | | 227 | 1.2 | | |
| | 74.6 | 25.4 | — | — | 1.31 | 0.52 | 2.49 | 0.05 | — | 25.7 | 0.3 | 2.4 | 30 | 2.33 | 10.0 | | 1.1 | 1125 | 32.7 |
| | 76.0 | 24.0 | — | — | 1.41 | 0.52 | 2.68 | 0.05 | — | 25.7 | 0.3 | 2.4 | 30 | 2.31 | 8.2 | | 1.3 | 1311 | 35.6 |
| | 78.1 | 21.9 | — | — | 1.61 | 0.52 | 3.07 | 0.05 | — | 25.7 | 0.3 | 2.4 | 30 | 2.28 | 8.0 | | 1.0 | 1191 | 37.4 |
| | 80.9 | 19.2 | — | — | 1.91 | 0.52 | 3.64 | 0.05 | — | 25.7 | 0.3 | 2.4 | 30 | 2.24 | 7.1 | | 1.2 | 1158 | 39.6 |
| | 84.5 | 18.5 | — | — | 2.41 | 0.52 | 4.60 | 0.05 | — | 25.7 | 0.3 | 2.4 | 30 | 2.22 | 7.2 | | 1.5 | 1056 | 42.3 |
| | 88.3 | 11.7 | — | — | 3.41 | 0.52 | 6.52 | 0.05 | — | 25.7 | 0.3 | 2.4 | 30 | 2.11 | 8.7 | | 2.2 | 1007 | 37.6 |
| | 92.3 | 7.7 | — | — | 5.22 | 0.52 | 9.96 | 0.05 | — | 25.7 | 0.3 | 2.4 | 30 | 2.03 | 23.0 | | 2.9 | 832 | 34.8 |
| Comp. Ex. 3 | 61.2 | 32.4 | — | 6.4 | | | | | | | | | | 2.20 | 13.8 | | 1.5 | | 30 |

In Example 1 of the present invention, $CoSO_4.7H_2O$ (Co ions 0.52 g/l), $FeSO_4.7H_2O$ (Fe ions 1.00 g/l), NaCl (25 g/l), $H_3BO_3$ (25 g/l) and malonic acid were added to a plating bath. Sodium saccharin was not added to the plating bath.

With respect to the film forming condition, the plating bath temperature was set at 30° C., and the pH of the electrode was set within the range of 2.1 to 2.5. When pulsed current was used for the electroplating method, the duty ratio (ON/OFF) of the pulsed current was set at 0.3. Some CoFe alloys were formed by plating using direct current instead of using pulsed current.

A plurality of CoFe alloys were formed by plating using the plating bath containing 0.03 g/l or 0.05 g/l of malonic acid.

In Example 2, $CoSO_4.7H_2O$ (Co ions 0.52 g/l), $FeSO_4.7H_2O$ (refer to Table 1 for information on the amount of Fe ions), NaCl (25 g/l), $H_3BO_3$ (25 g/l) and malonic acid (0.05 g/l) were added. Sodium saccharin was not added to the plating bath. Each of the soft magnetic films of Example 2 was formed by plating with pulsed current under the same film formation condition as that in Example 1.

In Comparative example 1, alloys containing Co and Fe were formed by plating using plating baths containing $CoSO_4.7H_2O$ (refer to Table 1 for information on the amount of Co ions), $FeSO_4.7H_2O$ (refer to Table 1 for information on the amount of Fe ions), NaCl (25 g/l), $H_3BO_3$ (25 g/l) and sodium saccharin. In Comparative example 2, alloys containing Co and Fe were formed by plating using plating baths containing $CoSO_4.7H_2O$ (refer to Table 1 for information on the amount of Co ions), $FeSO_4.7H_2O$ (refer to Table 1 for information on the amount of Fe ions), NaCl (25 g/l) and $H_3BO_3$ (25 g/l). In Comparative example 3, a CoFeRh alloy was formed by plating as well. Each of the soft magnetic films of the Comparative examples was formed by plating with pulsed current under the same film forming condition as that in Example.

Each of soft magnetic films formed using the plating baths in Example 1, Example 2 (hereafter, "Examples" described in FIG. 4 to FIG. 11 collectively refers to Example 1 and Example 2) and the Comparative examples 1 to 3 was used so that relationships between the amount of Fe of the soft magnetic film and various magnetic characteristics were examined. The relationship between the Fe concentration and the saturation magnetic flux density Bs is shown in FIG. 4.

Figure 4:
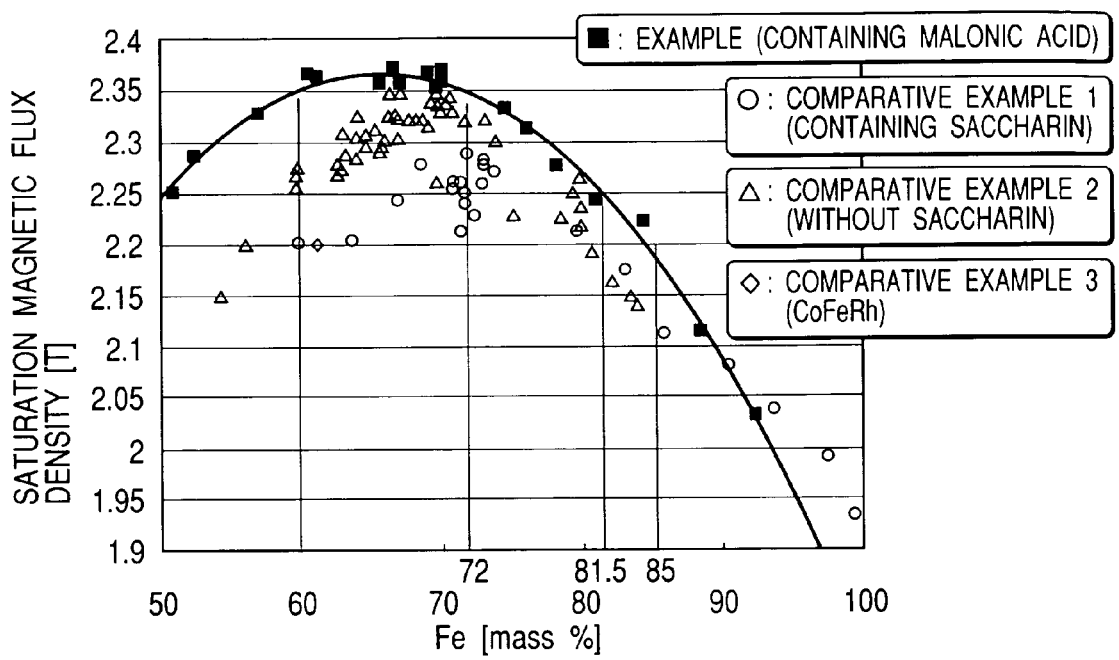
FIG. 4 is a graph showing the relationship between the amount of Fe and the saturation magnetic flux density Bs of each soft magnetic film in Example and Comparative examples 1 to 3 formed by plating under the condition shown in Table 1.

As is clear from FIG. 4, with respect to the CoFe alloy formed by plating using the plating bath in the Examples, when the amount of Fe was adjusted to be 50% to 85% by weight, the saturation magnetic flux density Bs was increased to 2.2 T or more. Even some compositions in the Comparative examples can achieve the saturation magnetic flux densities Bs of 2.2 T or more, although the compositional ranges thereof are smaller than that in Example. That is, the compositional range of the Fe concentration, which can achieve the saturation magnetic flux densities Bs of 2.2 T or more, can be increased by adding malonic acid to the plating bath, as shown in the Examples.

As is clear from FIG. 4, with respect to the CoFe alloy formed by plating using the plating bath in the Example, when the amount of Fe was adjusted to be 50% to 81.5% by weight, the saturation magnetic flux density Bs increased to 2.25 T or more.

As is clear from FIG. 4, with respect to the CoFe alloy formed by lating using the plating bath in the Example, when the amount of Fe was adjusted to 60% to 72% by weight, the saturation magnetic flux density Bs increased to 2.35 T or more. No CoFe alloy in Comparative examples was able to achieve the saturation magnetic flux density Bs of 2.35 T or more. Consequently, it is clear that the CoFe alloy in the Example was able to achieve a saturation magnetic flux density Bs of 2.35 T or more, which was higher than the conventional alloy.

Figure 5:
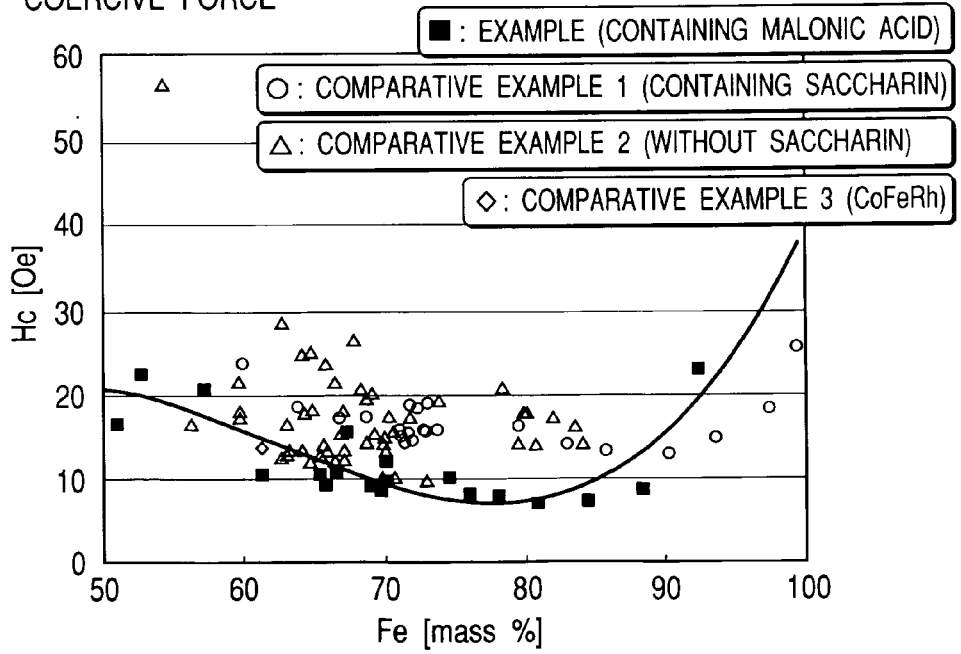
FIG. 5 is a graph showing the relationship between the amount of Fe and the coercive force Hc of each soft magnetic film in Example and Comparative examples 1 to 3 formed by plating under the condition shown in Table 1.

The relationship between the amount of Fe and the coercive force Hc is shown in FIG. 5. Here, 1 (Oe) corresponds to 79 (A/m). As is clear from FIG. 5, with respect to the CoFe alloy formed by plating using the plating bath in the Examples, when the amount of Fe was in the range of about 60% by mass to 90% by mass, the coercive force Hc was 1,185 (A/m) or less (=15 Oe or less). Therefore, the coercive force is lower than or equivalent to that of the alloys containing Co and Fe, which were formed by plating using the plating baths in the Comparative examples. In particular, with respect to the coercive force Hc when the amount of Fe was 60% to 72% by weight, which is the most preferable range from the viewpoint of the saturation magnetic flux density Bs, the coercive force Hc was reduced to the order of 10 Oe.

Figure 6:
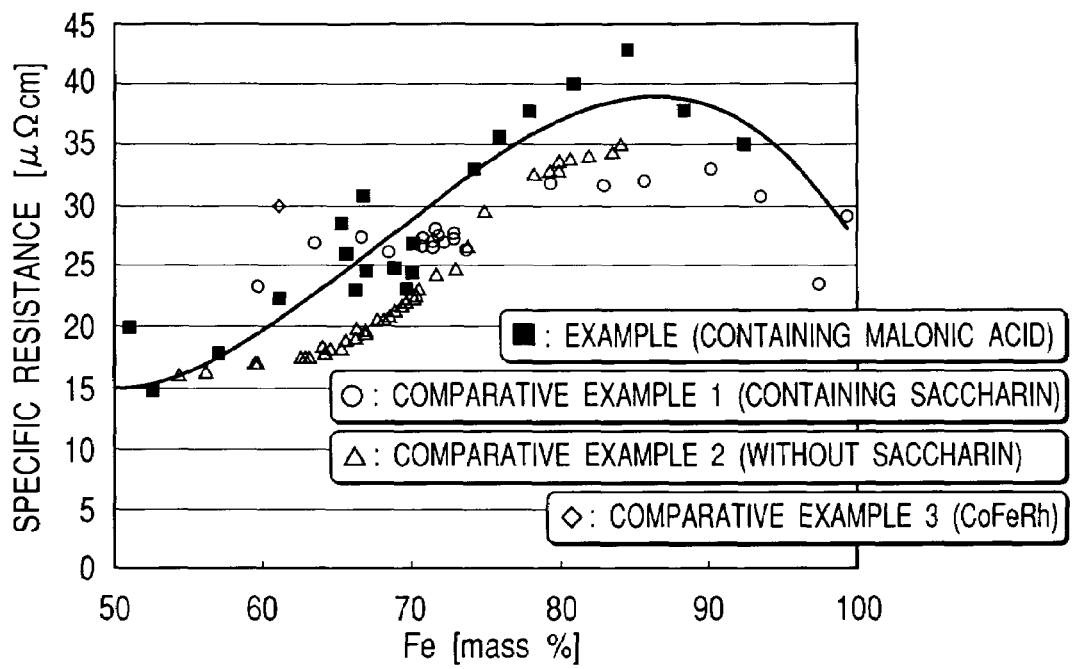
FIG. 6 is a graph showing the relationship between the amount of Fe and the specific resistance of each soft magnetic film in Example and Comparative examples 1 to 3 formed by plating under the condition shown in Table 1.

The relationship between the Fe concentration and the specific resistance is shown in FIG. 6. As is clear from FIG. 6, with respect to the CoFe alloy formed by plating using the plating bath in the Examples, the specific resistance increased to 20 (μΩ·cm) or more over a wide compositional range. Therefore, the specific resistance is higher than or equivalent to that of the alloys containing Co and Fe, which were formed by plating using the plating baths in the Comparative examples.

Figure 7:
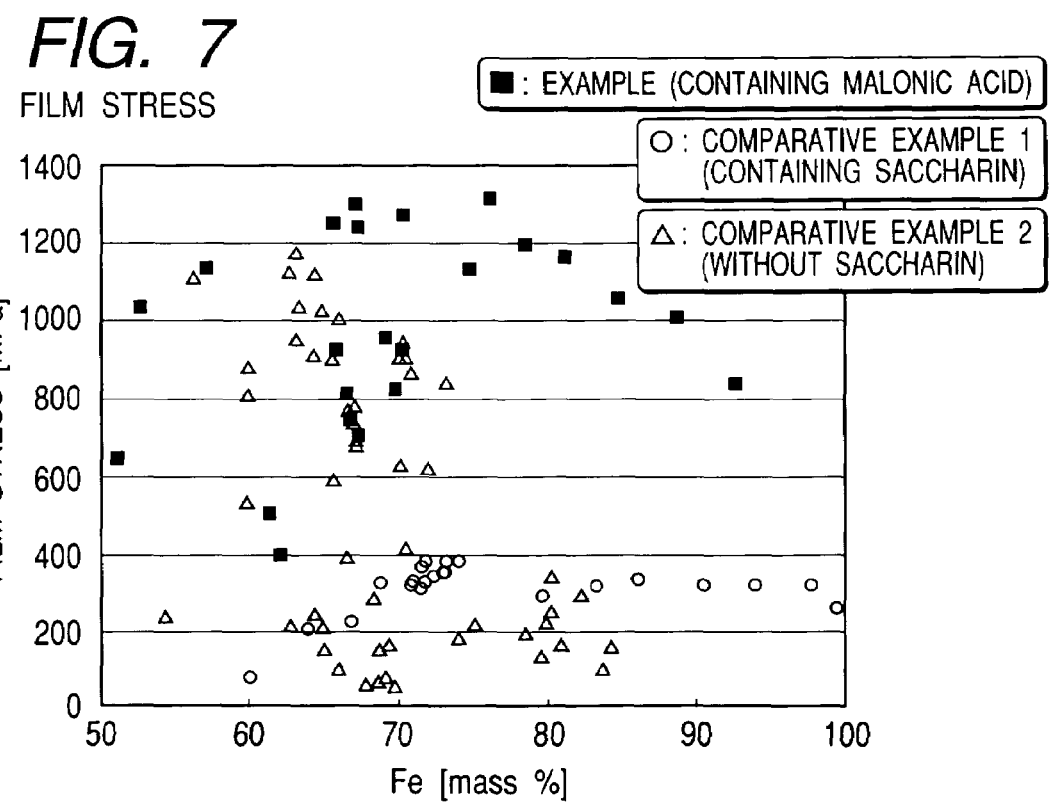
FIG. 7 is a graph showing the relationship between the amount of Fe and the film stress of each soft magnetic film in Example and Comparative examples 1 and 2 formed by plating under the condition shown in Table 1.

The relationship between the Fe concentration and the film stress is shown in FIG. 7. As is clear from FIG. 7, with respect to the CoFe alloy formed by plating using the plating bath in the Examples, although maximum film stresses increased to the order of 1,200 (MPa) in some compositional ranges, in particular, when the Fe concentration was 60% to 72% by weight, which is the most preferable range from the viewpoint of the saturation magnetic flux density Bs, the film stress was reduced to the order of 1,000 MPa or less, preferably, 600 MPa or less by adjusting the amount of Fe.

With respect to the soft magnetic films formed using the plating baths in the Examples and the Comparative examples 1 and 2, the relationship between the Fe concentration and the crystal particle diameter and the relationship between the amount of Fe and the center line average roughness Ra of the film surface were examined.

Figure 8:
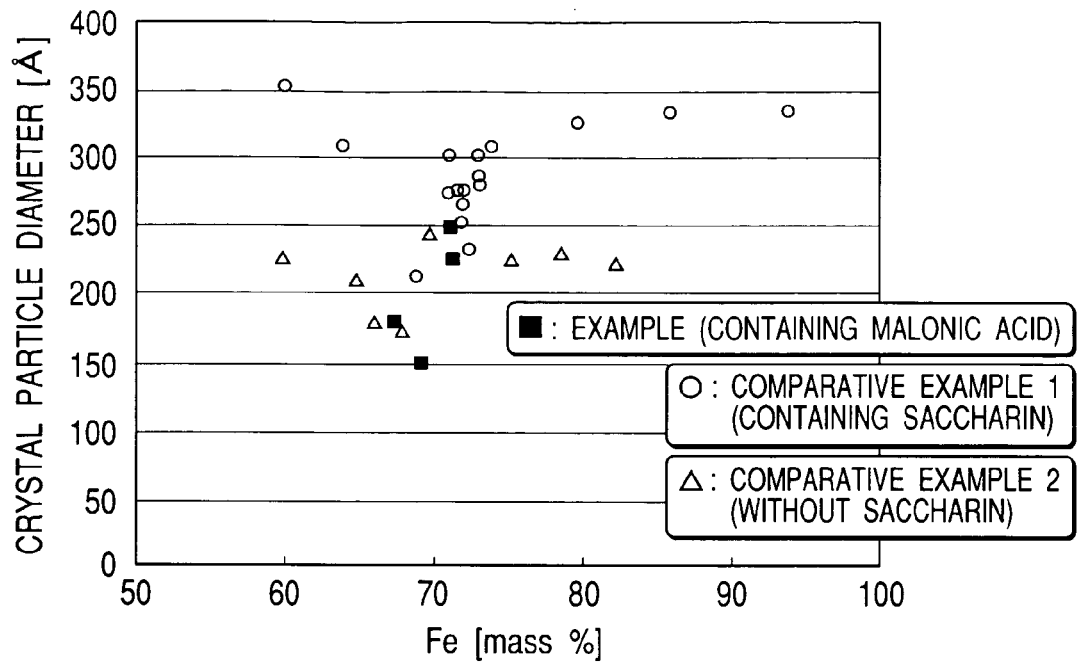
FIG. 8 is a graph showing the relationship between the amount of Fe and the crystal particle diameter of each soft magnetic film in Example and Comparative examples 1 and 2 formed by plating under the condition shown in Table 1.

FIG. 8 is a graph showing the relationship between the Fe concentration and the crystal particle diameter. As is clear from FIG. 8, the crystal particle diameters of the CoFe alloys formed by plating using the plating baths in the Examples tended to become smaller than the crystal particle diameters of the alloys containing Co and Fe formed by plating using the plating baths in the Comparative examples 1 and 2. Therefore, the crystal particle diameters of the CoFe alloys formed by plating using the plating baths in Example were controlled to 200 angstroms or less.

Figure 9:
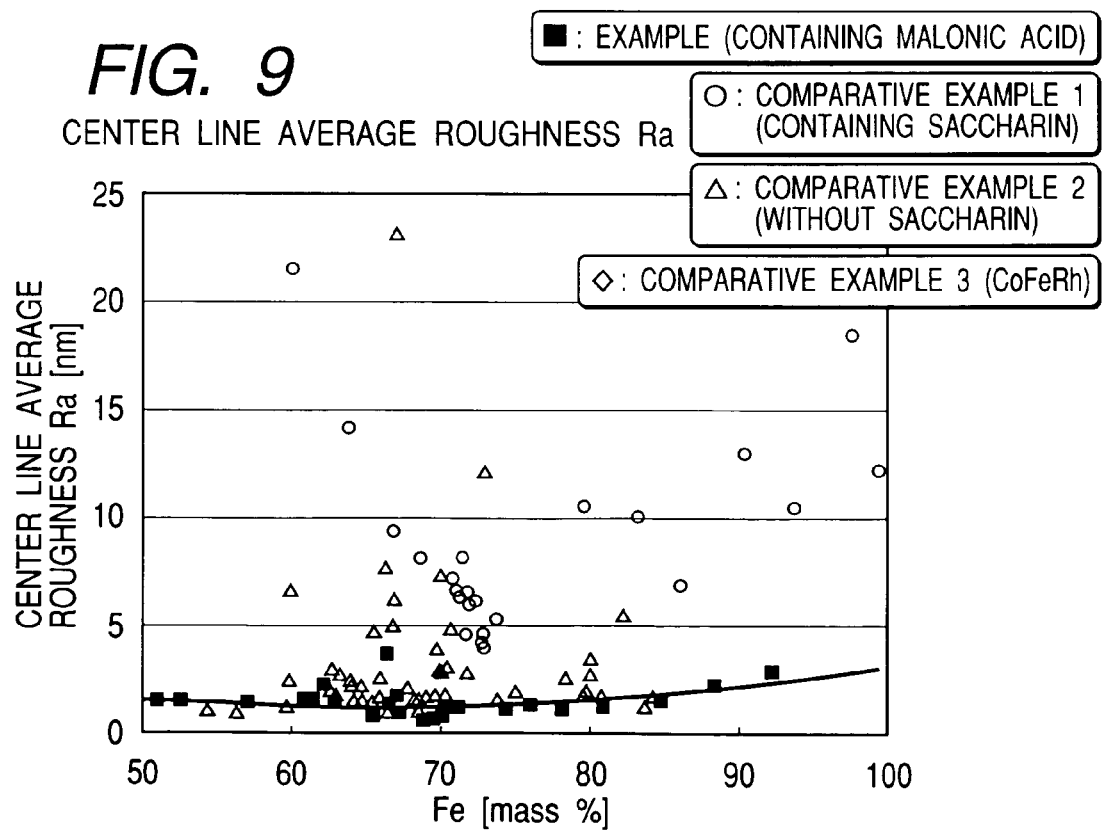
FIG. 9 is a graph showing the relationship between the amount of Fe and the center line average roughness Ra of the film surface of each soft magnetic film in Example and Comparative examples 1 to 3 formed by plating under the condition shown in Table 1.

FIG. 9 is a graph showing the relationship between the Fe concentration and the center line average roughness Ra of the film surface. As is clear from FIG. 9, the center line average roughness Ra of the CoFe alloys formed by plating using the plating baths in the Examples tended to be smaller than the center line average roughness Ra of the alloys containing Co and Fe formed by plating using the plating baths in the Comparative examples 1 and 2. Therefore, the center line average roughness Ra of the film surface of the CoFe alloys formed by plating using the plating baths in Example were controlled at 2.5 nm or less.

Figures 10, 11:
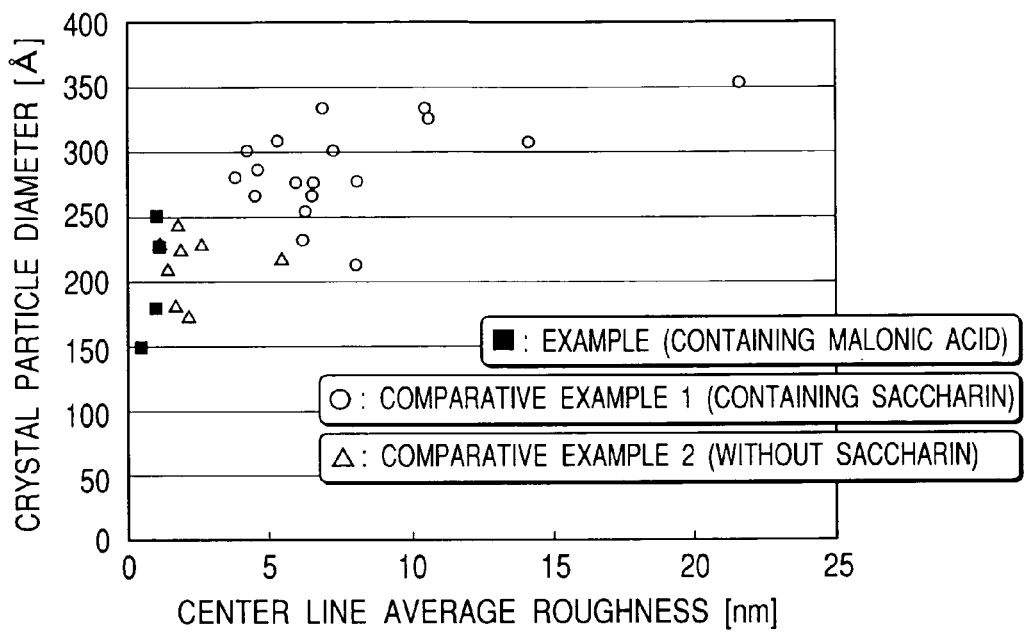
FIG. 10 is a graph showing the relationship between the center line average roughness and the crystal particle diameter of each soft magnetic film in Example and Comparative examples 1 and 2 formed by plating under the condition shown in Table 1.
FIG. 11 is a graph showing the relationship between the center line average roughness Ra of the film surface and the saturation magnetic flux density Bs of each soft magnetic film in Example and Comparative examples 1 to 3 formed by plating under the condition shown in Table 1.

FIG. 10 is a graph showing the relationship between the center line average roughness Ra of the film surfaces and the crystal particle diameters of the soft magnetic films formed by plating using the plating baths in the Examples and Comparative examples 1 and 2. As is clear from FIG. 10, the crystal particle diameters are decreased with decreases in the center line average roughness Ra of the film surfaces. It was made clear that all soft magnetic films formed by plating using the plating baths in the Examples and the Comparative examples 1 and 2 showed in common this tendency, but the center line average roughness Ra of the film surfaces and the crystal particle diameters of the CoFe alloys formed by plating using the plating baths in the Examples were able to be made very small compared with those of the alloys containing Co and Fe, which were formed by plating using the plating baths in Comparative examples 1 and 2.

FIG. 11 is a graph showing the relationship between the center line average roughness Ra of the film surfaces and the saturation magnetic flux densities Bs of the soft magnetic films formed by plating using the plating baths in the Examples and Comparative examples 1 to 3.

As is clear from FIG. 11, the saturation magnetic flux densities Bs are increased with decreases in the center line average roughness Ra of the film surfaces. It was made clear that all soft magnetic films formed by plating using the plating baths in the Examples and the Comparative examples 1 to 3 showed this common tendency, but the saturation magnetic flux densities Bs of the CoFe alloys formed by plating using the plating baths in Example were able to be effectively increased compared with that of the alloys containing Co and Fe formed by plating using the plating baths in the Comparative examples 1 to 3. In particular, a saturation magnetic flux density Bs of 2.35 T or more was able to be achieved with respect to the CoFe alloy in the Examples.

As described above, the CoFe alloys in Example, that is, formed by plating using the plating baths containing malonic acid without addition of sodium saccharin can accelerate microcrystallization and reduce the center line average roughness Ra of the film surface. In addition, other magnetic characteristics can also be adjusted to be within the range suitable for a magnetic pole layer and a core layer of a thin film magnetic head, for example, the saturation magnetic flux density Bs can be improved and the coercive force can be reduced.

When malonic acid is added to the plating bath, since the above-mentioned malonic acid is a complexing agent, the trivalent Fe ion contained in the above-mentioned plating bath is likely to form a complex compound with the above-mentioned malonic acid. As a result, it is believed that Fe in the CoFe alloy primarily is the divalent Fe ion in the plating bath, and it is believed that trivalent Fe ions, which cause reduction of the saturation magnetic flux density Bs, are unlikely to be taken into the CoFe alloy. Consequently, with respect to the CoFe alloy in the Examples, the saturation magnetic flux density Bs is higher than that of the CoFe alloys in the Comparative examples, the above-mentioned saturation magnetic flux density Bs can be increased to 2.2 T or more by adjusting the amount of Fe to be 50% to 85% by mass. The above-mentioned saturation magnetic flux density Bs can be increased to 2.25 T or more by adjusting the amount of Fe to be 50% to 81.5% by mass. Furthermore, the above-mentioned saturation magnetic flux density Bs can be increased to 2.35 T or more by adjusting the amount of Fe to be 60% to 72% by mass or less.

Experiments on corrosion resistance were performed with respect to each soft magnetic films described in the Example and in Comparative examples 1 to 3. In the experiments, a solid film of each soft magnetic film was formed by plating on a substrate. The substrates were processed into a circular pattern of 7 mm in diameter, followed by immersion in an aqueous sulfuric acid of pH 4.0 for 30 minutes. Subsequently, occurrence of corrosion was observed with a metallurgical microscope. The experimental results are shown in the following Table 2.

TABLE 2

| Plated film name | Composition [mass %] | Surface roughness [nm] | Experimental result of corrosion resistance test | ⊚, ○, Δ, x |
|---|---|---|---|---|
| Comparative example 3 | Fe/Co/Rh = 65/33/2 | 1.4 | Corrosion in edge | Δ |
|  | Fe/Co/Rh = 64/32/4 | 1.5 | Corrosion in edge | Δ |
| Comparative example 1 | Fe/Co = 68/32 | 8.1 | Corrosion all over surface | x |
|  | Fe/Co = 72/28 | 4.2 | Corrosion all over surface | x |
| Comparative example 2 | Fe/Co = 64/36 | 1.4 | No corrosion | ○ |
|  | Fe/Co = 70/30 | 1.8 | No corrosion | ○ |
|  | Fe/Co = 74/26 | 1.9 | No corrosion | ○ |
|  | Fe/Co = 84/16 | 1.7 | No corrosion | ○ |
|  | Fe/Co = 90/10 | 1.8 | No corrosion | ○ |
| Examples | Fe/Co = 64/36 | 0.8 | No corrosion | ⊚ |
|  | Fe/Co = 70/30 | 0.5 | No corrosion | ⊚ |

⊚: No corrosion is observed.
○: No corrosion is observed, but change in color is observed.
Δ: Corrosion is partially observed.
x: Corrosion is observed all over the surface.

As shown in Table 2, with respect to the CoFeRh alloy (Comparative example 3), corrosion was observed in the edge portion of the experimental sample. With respect to the alloy containing Co and Fe, formed by plating using the plating bath containing sodium saccharin (Comparative example 1), corrosion was observed all over the experimental sample.

On the other hand, with respect to the alloy containing Co and Fe, formed by plating using the plating bath without addition of sodium saccharin (Comparative example 2), although no corrosion was observed in the experimental sample, there was a change in color of the film surface compared with the CoFe alloys formed by plating using the plating baths containing malonic acid without addition of sodium saccharin (Examples). Consequently, it was verified that the CoFe alloys in the Examples have corrosion resistance superior to that of each soft magnetic film in the Comparative examples.

The reason the CoFe alloys in the Examples have excellent corrosion resistance is believed to be related to the structure of the CoFe alloys in the Examples. Microcrystallization is accelerated compared with that in each of the soft magnetic films in the Comparative examples, and therefore, the center line average roughness Ra of the film surface is very small.

As described above, with respect to the CoFe alloys formed by plating using the plating baths containing malonic acid without addition of sodium saccharin, both of the saturation magnetic flux density Bs and the corrosion resistance can be effectively improved.

Figure 12:
FIG. 12 is a TEM photograph of a cross-section parallel to the film thickness direction of a CoFe alloy formed by plating with pulsed current without addition of malonic acid nor sodium saccharin to a plating bath.
Figure 13:
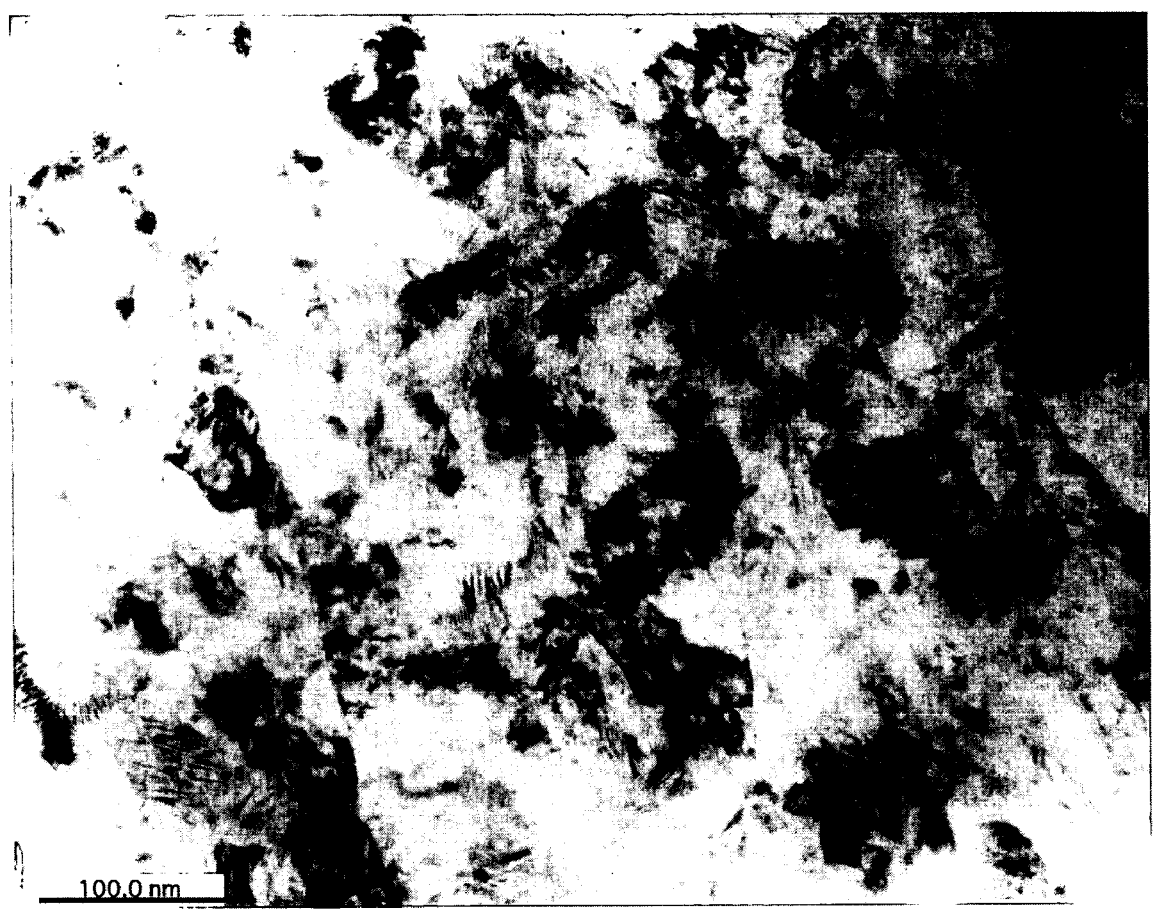
FIG. 13 is a magnified part of the TEM photograph shown in FIG. 12.

The soft magnetic films in the Examples and Comparative example 2 were cut in the direction parallel to the film thickness direction. The crystals appearing on the cut surfaces were observed with a transmission electron microscope (TEM). FIG. 12 is a TEM photograph of an alloy containing Co and Fe (70% Fe and 30% Co by mass), formed by plating through an electroplating method with pulsed current without addition of sodium saccharin nor malonic acid to a plating bath (Comparative example 2). FIG. 13 is a magnified part of the photograph shown in FIG. 12.

As shown in FIG. 12 and FIG. 13, the soft magnetic film formed by plating is believed to be substantially crystalline. However, the type of crystalline form cannot be determined. As is clear from FIG. 13, not many grain boundaries are observed, and therefore, each crystal is believed to be in the shape of one large lump.

Figure 14:
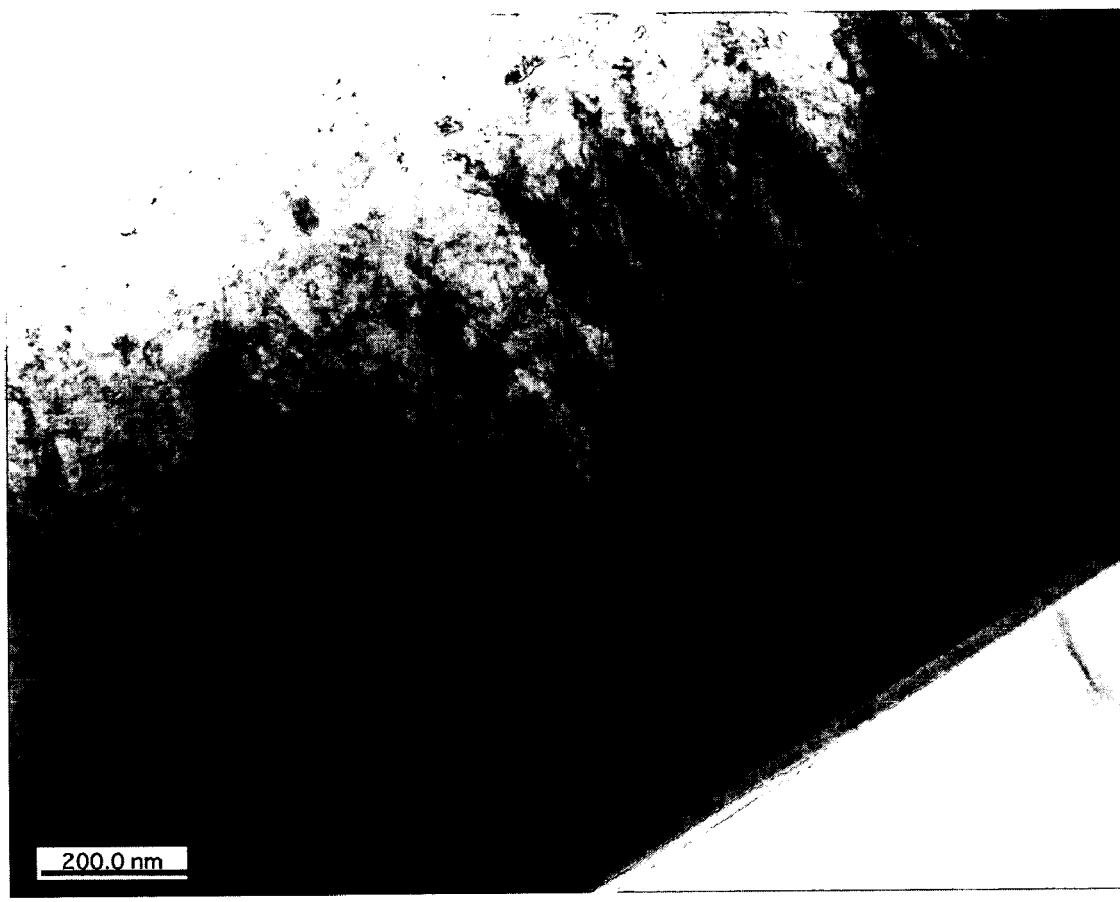
FIG. 14 is a TEM photograph of a cross-section parallel to the film thickness direction of a CoFe alloy formed by plating with pulsed current while 0.03 g/l of malonic acid is added to a plating bath.
Figure 15:
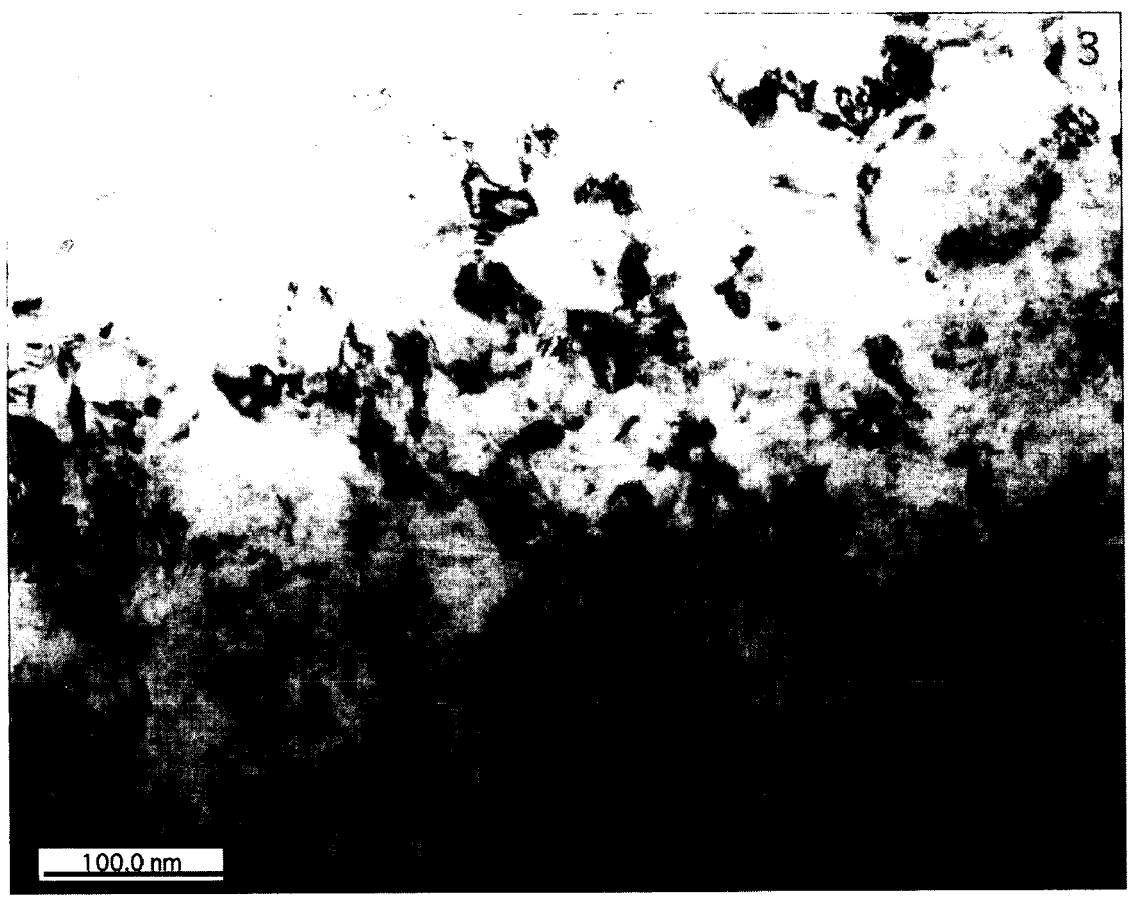
FIG. 15 is a magnified part of the TEM photograph shown in FIG. 14.

FIG. 14 is a TEM photograph of a CoFe alloy (70.1% Fe, and 29.9% Co by mass) formed by plating through an electroplating method with pulsed current while 0.03 g/l of malonic acid is added to a plating bath. FIG. 15 is a magnified part of the photograph shown in FIG. 14.

As shown in FIG. 14, many black stripe-shaped contrasts are shown extending in the CoFe alloy from the substrate in the film thickness direction. It is believed that crystals grow into columnar shapes from the substrate side toward the film surface direction by plating. As shown in the magnified photograph of FIG. 15, grain boundaries can be observed at a plurality of places, and these long grain boundaries extend in the film thickness direction. Therefore, the crystal region sandwiched between the grain boundaries is in a state of a columnar crystal extending in the film thickness direction.

Figure 16:
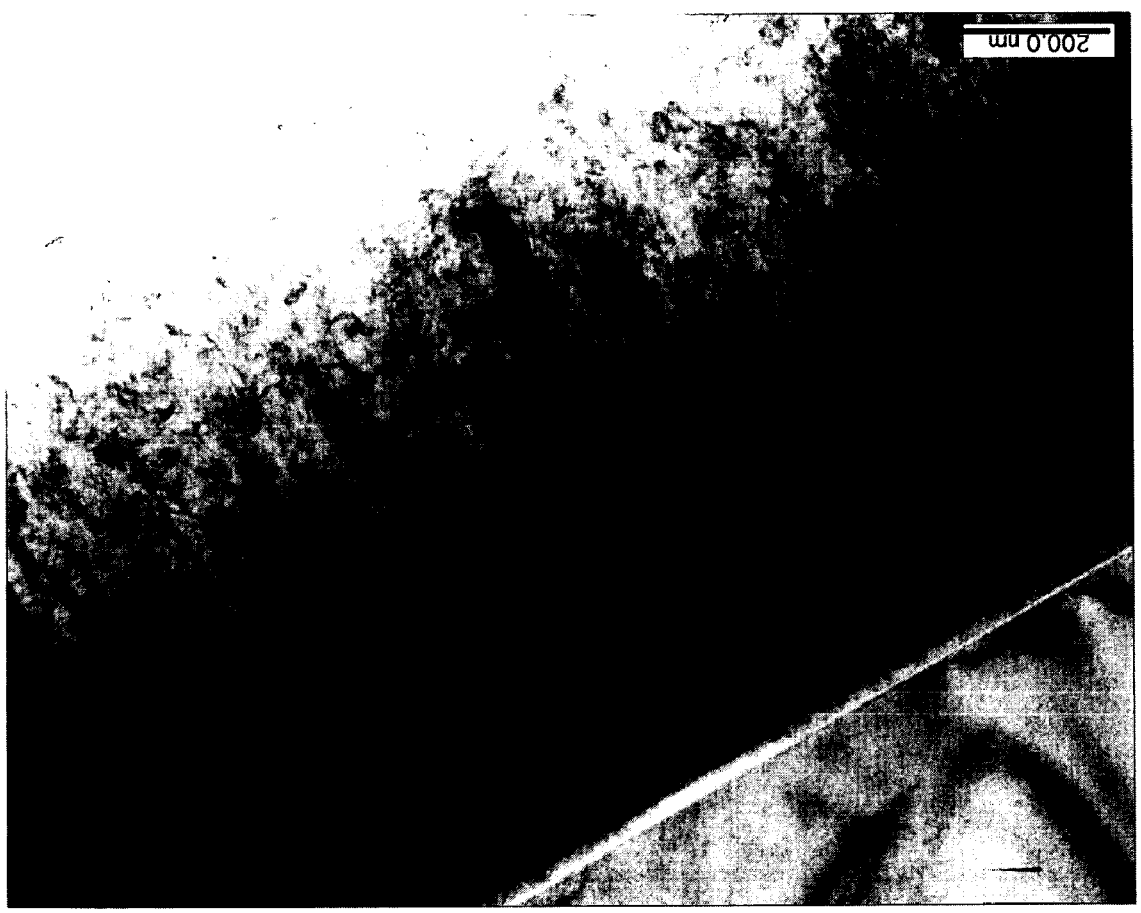
FIG. 16 is a TEM photograph of a cross-section parallel to the film thickness direction of a CoFe alloy formed by plating with pulsed current while 0.05 g/l of malonic acid is added to a plating bath.
Figure 17:
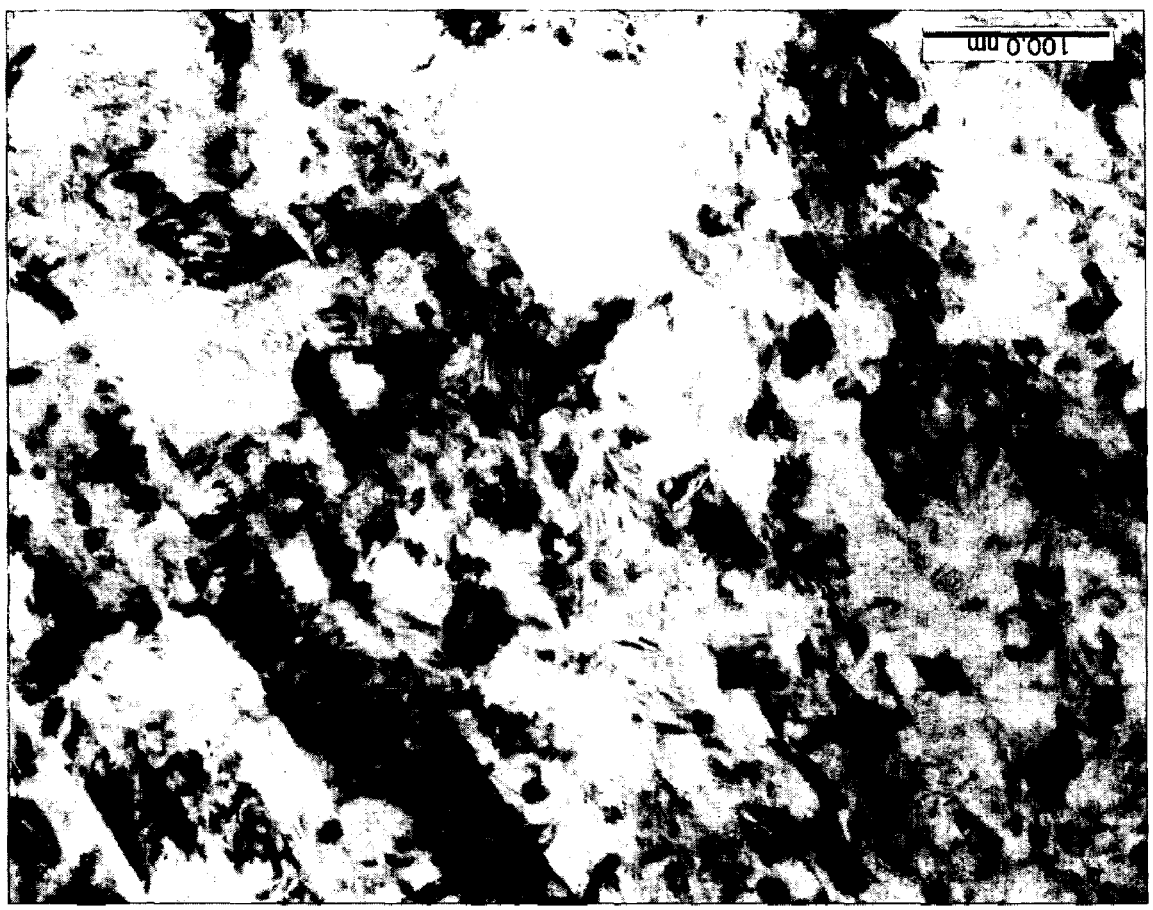
FIG. 17 is a magnified part of the TEM photograph shown in FIG. 16.

FIG. 16 is a TEM photograph of a CoFe alloy (69% Fe, and 31% Co by mass) formed by plating through an electroplating method with pulsed current while 0.05 g/l of malonic acid is added to a plating bath. FIG. 17 is a magnified part of the photograph shown in FIG. 16.

In the CoFe alloy shown in FIG. 16, many black stripe-shaped contrasts are shown extending from the substrate toward in film thickness direction are in a manner similar to that in FIG. 14. It is believed that crystals grow into columnar shapes from the substrate toward the film surface by plating. In particular, as shown in the magnified photograph of FIG. 17, grain boundaries can be clearly observed at a plurality of places, and these long grain boundaries linearly extend in the film thickness direction. Therefore, the crystal region sandwiched between the grain boundaries is in a state of columnar crystal linearly extending in the film thickness direction. Furthermore, as shown in FIG. 17, the contrast between white portions and black portions in the above-mentioned columnar crystal can be clearly seen in the photograph. Therefore, it is believed that each columnar crystal is formed by the piling up of microcrystals.

FIG. 14 to FIG. 17 indicate that when the amount of malonic acid added to the plating bath is adjusted to be 0.05 g/l rather than 0.03 g/l, the columnar crystals extending in the film thickness direction can be more clearly observed. These columnar crystals are likely to be formed side by side in the film surface direction with grain boundaries extending in the film thickness direction therebetween Furthermore, the above-mentioned columnar crystals are likely to be formed by a piling up of a plurality of microcrystals.

Figure 18:
FIG. 18 is a TEM photograph of a cross-section parallel to the film thickness direction of a CoFe alloy formed by plating with direct current while 0.05 g/l of malonic acid is added to a plating bath.
Figure 19:
FIG. 19 is a magnified part of the TEM photograph shown in FIG. 18.

FIG. 18 is a TEM photograph of a CoFe alloy (67% Fe and 33% Co by mass) formed by plating through an electroplating method with direct current while 0.05 g/l of malonic acid is added to a plating bath. FIG. 19 is a magnified part of the photograph shown in FIG. 18.

In the cross-sectional view of the CoFe alloy shown in FIG. 18, many black stripe-shaped contrasts extend from the substrate in the film thickness direction in a manner similar to those shown in FIG. 14 and FIG. 16. It is believed that crystals grow into columnar shapes from the substrate side toward the film surface direction by plating. As shown in the magnified photograph of FIG. 19, grain boundaries can be observed at a plurality of places, and these grain boundaries long extend in the film thickness direction. Therefore, the crystal region sandwiched between the above-mentioned grain boundaries is in a state of a columnar crystal extending in the film thickness direction.

The CoFe alloy shown in FIG. 18 and FIG. 19 was formed by plating with direct current. Accordingly, the columnar crystals can also form with direct current in a plating bath containing malonic acid.

As described above, columnar crystals extending in the film thickness direction were formed in the CoFe alloy formed by plating with pulsed current or direct current while malonic acid was added to the plating bath. When 0.05 g/l of malonic acid was added, fine columnar crystals were likely to be formed side by side in the film surface direction with grain boundaries extending in the film thickness direction therebetween. Furthermore, these columnar crystals were likely to be formed by piling up of microcrystals compared with that in the case where 0.03 g/l of malonic acid was added. It was also made clear that when the pulsed current was used during formation of the plating, the above-mentioned columnar crystals were likely to be appropriately formed all over the film of the CoFe alloy. The above-mentioned columnar crystals were finely formed in the film surface direction with grain boundaries extending in the film thickness direction therebetween compared with that in the case where the direct current was used.

Figure 20:
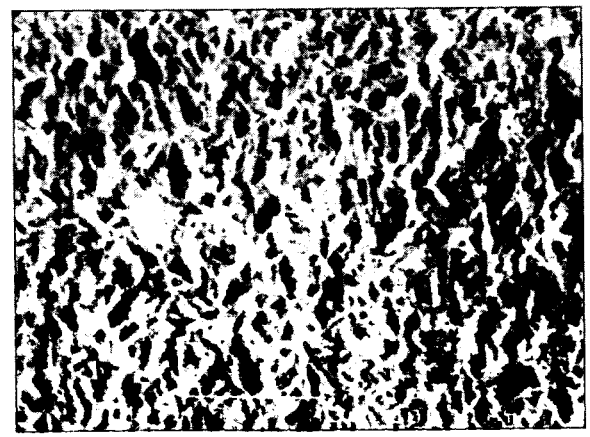
FIG. 20 is a SEM photograph of the film surface of a CoFe alloy formed by plating with pulsed current without addition of malonic acid nor sodium saccharin to a plating bath.
Figure 21:
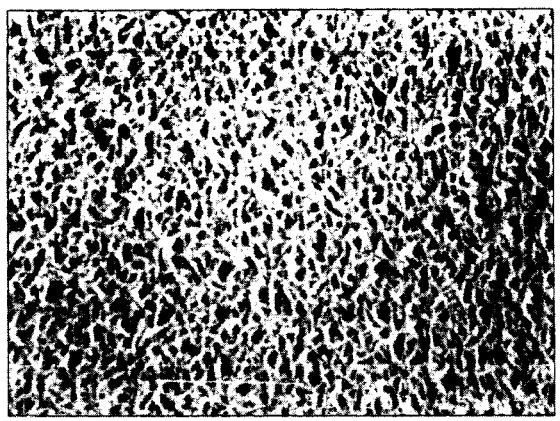
FIG. 21 is a SEM photograph of the film surface of a CoFe alloy formed by plating with pulsed current while 0.03 g/l of malonic acid is added to a plating bath.
Figure 22:
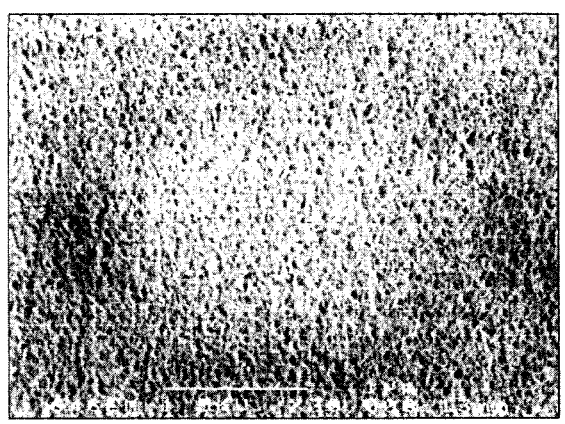
FIG. 22 is a SEM photograph of the film surface of a CoFe alloy formed by plating with pulsed current while 0.05 g/l of malonic acid is added to a plating bath.

FIG. 20 to FIG. 22 are scanning electron microscope (SEM) photographs showing the states of the film surfaces of soft magnetic films formed under the following conditions. With respect to the film forming conditions, the current density was adjusted to 25.7 (mA/cm2), the duty ratio (ON/OFF) of the pulsed current was set at 200/800 msec, and the pH of the electrode was set at 2.2.

FIG. 20 is an SEM photograph of the film surface of an alloy containing Co and Fe (70% Fe and 30% Co by mass) formed by plating without addition of malonic acid nor sodium saccharin to a plating bath (Comparative example 2). FIG. 21 is an SEM photograph of a CoFe alloy (70.1% Fe and 29.9% Co by mass) formed by plating while 0.03 g/l of malonic acid is added to a plating bath (Examples). FIG. 22 is a SEM photograph of a CoFe alloy (69% Fe and 31% Co by mass) formed by plating while 0.05 g/l of malonic acid is added to a plating bath (Examples).

It is clear that the film surface shown in FIG. 22 exhibits the smallest surface roughness, followed by the film surface shown in FIG. 21. The film surface shown in FIG. 20 exhibits the largest surface roughness. Accordingly, the surface roughness of the CoFe alloy was improved by addition of malonic acid to the plating bath. When 0.05 g/l of the above-mentioned malonic acid was added, the surface roughness of the CoFe alloy was further improved compared with that in the case where 0.03 g/l of malonic acid was added.

Figure 23:
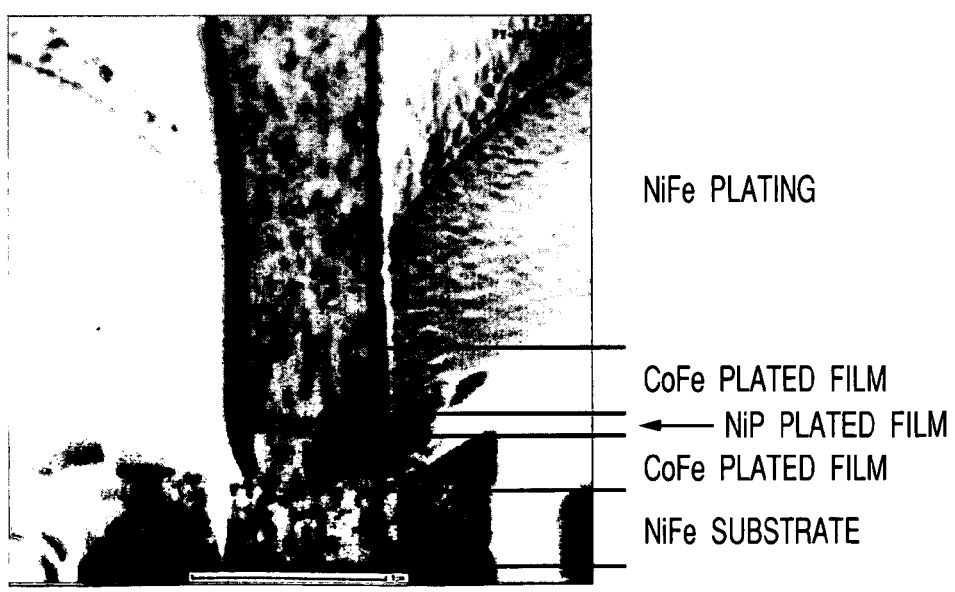
FIG. 23 is a SIM photograph of a cross-section parallel to the film thickness direction of a magnetic pole portion of a thin film magnetic head, having a lower magnetic pole layer and an upper magnetic pole layer formed from the CoFe alloy of the present invention.

FIG. 23 is a Scanning Ion Microscope (SIM) photograph of a cross-section of a thin film magnetic head cut along the front (the same surface as that shown in FIG. 1) toward the film thickness direction with an FIB (Focused Ion Beam) apparatus. The lower magnetic pole layer and the upper magnetic pole layer were formed by plating with the pulsed current, while 0.05 g/l of malonic acid was added to a plating bath.

The portions indicated by "CoFe plated film" shown in FIG. 23 are magnetic pole layers, and a NiP plated film, which will become a gap layer, is provided between the magnetic pole layers. A three-layer portion including the lower CoFe plated film, the NiP plated film, and the upper CoFe plated film, corresponds to the magnetic pole portion 18 shown in FIG. 1. With respect to the CoFe plated films, the lower CoFe plated film provided under the NiP plated film corresponds to the lower magnetic pole layer 19, and the upper CoFe plated film provided on the top of the NiP plated film corresponds to the upper magnetic pole layer 21.

As shown in FIG. 23, the film surface of the CoFe plated film corresponding to the lower magnetic pole layer 19 is flattened. As a result, since the above-mentioned NiP plated film can be formed into a flattened surface, the NiP plated film can be prevented from bending, that is, from being formed into a so-called smile face shape. The film surface of the CoFe film corresponding to the upper magnetic pole layer 21 is also flattened. By forming the lower magnetic pole layer 19 and the upper magnetic pole layer 21 from the CoFe alloy using a plating bath containing malonic acid The surface roughness of the film surface of the above-mentioned magnetic pole layers 19 and 21 can be reduced, and be formed with a flat upper surface. Accordingly, the NiP plated film sandwiched between the magnetic pole layers 19 and 21 can be formed into the shape of a rectangle parallel to the width direction. In the magnetic pole portion 18, formed with a very small width dimension and height dimension, the gap layer must be formed into the predetermined shape in the width direction in order to have excellent recoding characteristics under increased media packing density. This can be realized by forming the lower magnetic pole layer 19 and the upper magnetic pole layer 21 from the CoFe alloy using a plating bath containing malonic acid.

Figure 24:
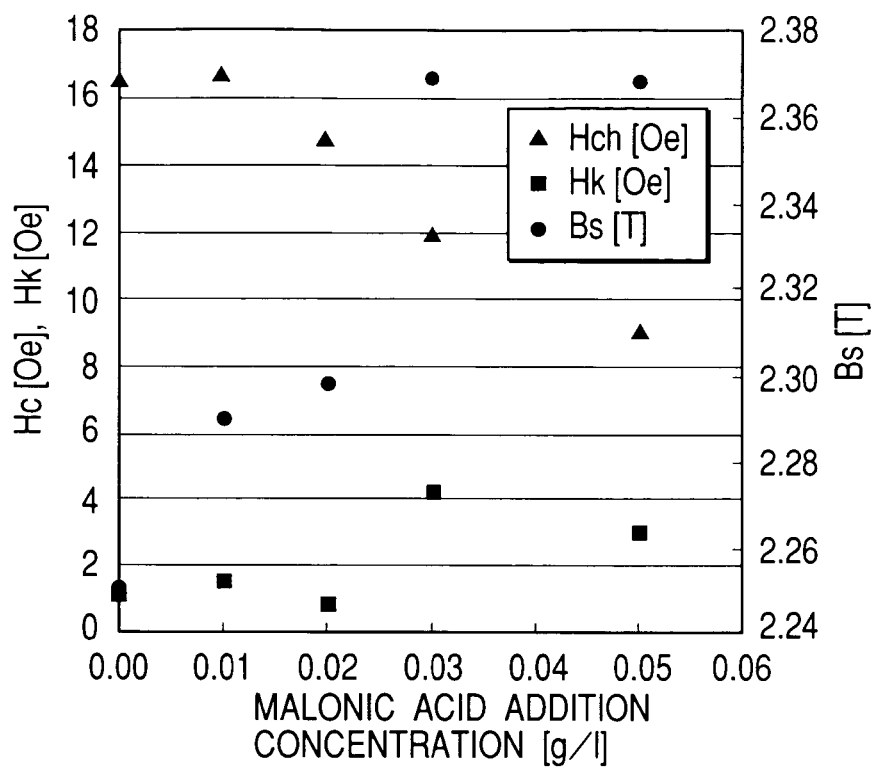
FIG. 24 is a graph showing the relationship between the amount of malonic acid added to a plating bath and the saturation magnetic flux density Bs, the coercive force Hc and the anisotropic magnetic field Hk of a CoFe alloy formed by plating.
Figure 25:
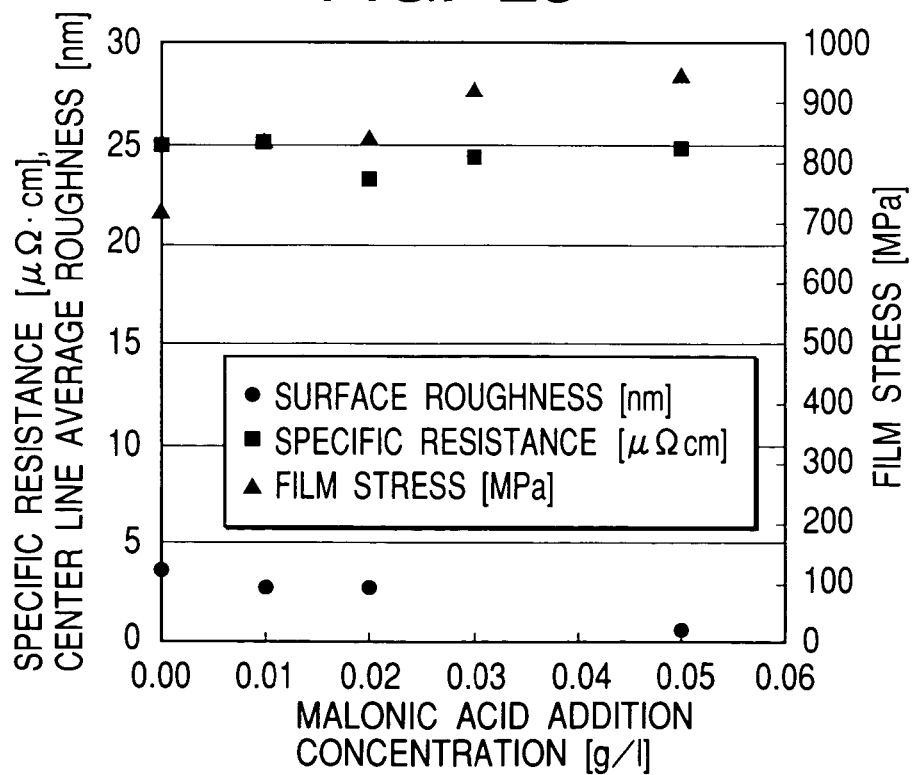
FIG. 25 is a graph showing the relationship between the amount of malonic acid added to a plating bath and the specific resistance, the surface roughness and the film stress of a CoFe alloy formed by plating.

FIG. 24 and FIG. 25 are graphs prepared based on the experimental results shown in the following Table 3. FIG. 24 is a graph showing the relationship between the malonic acid addition concentration and the saturation magnetic flux density Bs, the coercive force Hc and the anisotropic magnetic field Hk of a CoFe alloy. Here, 1 (Oe) corresponds to 79 (A/m).

TABLE 3

| Malonic acid [g/l] | Bs [T] | Hch [Oe] | Surface roughness [nm] | Film stress [MPa] | Specific resistance [μΩ cm] | Fe/Co. (mass %) |
|---|---|---|---|---|---|---|
| 0.00 | 2.25 | 16.5 | 3.6 | 723 | 24.9 | 71.1/28.9 |
| 0.01 | 2.29 | 16.7 | 2.7 | 838 | 25.1 | 70.0/30.0 |
| 0.02 | 2.30 | 14.8 | 2.7 | 847 | 23.2 | 70.3/29.7 |
| 0.03 | 2.37 | 12.0 | 1.1 | 926 | 24.4 | 70.1/29.9 |
| 0.05 | 2.37 | 9.0 | 0.5 | 950 | 24.8 | 69/31 |

As shown in Table 3, with respect to each sample, a CoFe alloy was formed by plating through an electroplating method with pulsed current while the amount of malonic acid in the plating bath was varied. With respect to the sample in which no malonic acid was added, a CoFe alloy having 71.1% Fe and 28.9% Co by mass was produced. With respect to the sample formed in a bath having a malonic acid concentration of 0.01 g/l, a CoFe alloy having 70% Fe and 30% Co by mass was produced. With respect to the sample formed in a bath having a malonic acid concentration of 0.02 g/l, a CoFe alloy having 70.3% Fe and 29.7% Co by mass was produced. With respect to the sample in formed in a bath having a malonic acid of 0.03 g/l, a CoFe having 70.1% Fe and 29.9% Co by mass was produced. And, with respect to the sample formed in a bath having a malonic acid concentration of 0.05 g/l, a CoFe alloy having 69% Fe and 31% Co by mass was produced. Accordingly, the compositional ratios of the CoFe alloys were not significantly different from each other.

As is clear from FIG. 24, the saturation magnetic flux density Bs was increased with an increase in the amount of malonic acid in the plating bath. In particular, when the amount of malonic acid increased to 0.03 g/l or more, the saturation magnetic flux density Bs of the CoFe alloy was increased to 2.35 T or more. Also, the coercive force Hc was decreased with an increase in the amount of addition of malonic acid to the plating bath.

FIG. 25 is a graph showing the relationship between the malonic acid concentration and the center line average roughness Ra of the film surface, the specific resistance, and the film stress of the CoFe alloy.

It is clear from FIG. 25 that the center line average roughness Ra of the CoFe film surface was reduced with an increase in the amount of malonic acid in the plating bath. In particular, when the amount of malonic acid increased 0.03 g/l or more, the center line average roughness Ra of the CoFe alloy was reduced to 2.5 nm or less.

It is clear from these experimental results that the amount of malonic acid in the plating bath is preferably 0.03 g/l or more, and the upper limit is preferably 0.05 g/l or less, because the saturation magnetic flux density is increased to 2.35 T or more.

Figure 26:
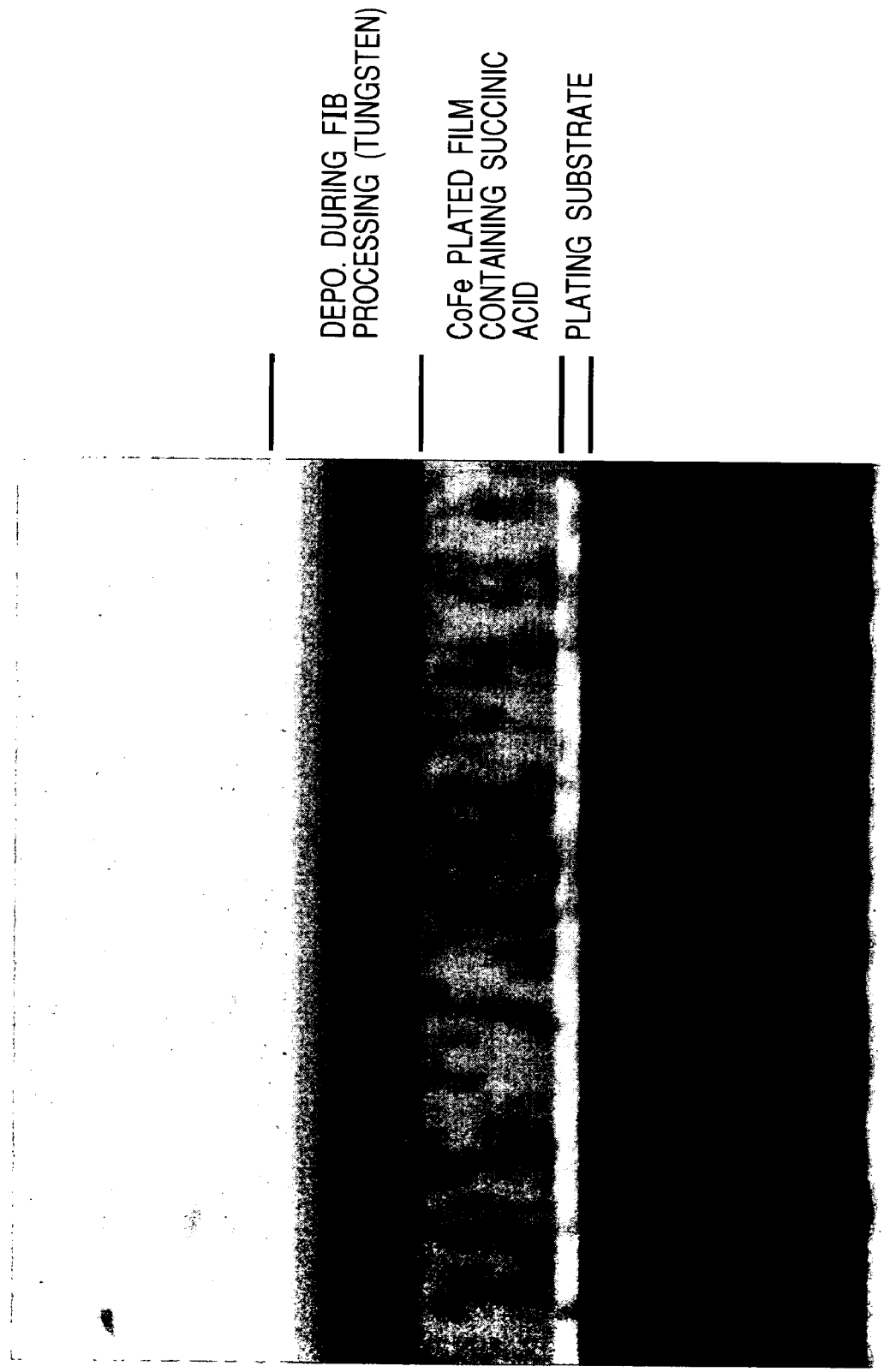
FIG. 26 is a SIM photograph of a cross-section parallel to the film thickness direction of a CoFe alloy formed by plating with pulsed current while 0.1 g/l of succinic acid is added to a plating bath.

FIG. 26 is a SIM photograph of a cross-section of a CoFe alloy film cut along the film thickness direction with an FIB (Focused Ion Beam) apparatus. The CoFe alloy film (69.2% Fe and 30.8% Co by mass) was formed by plating on a plating substrate film with pulsed current, while 0.1 g/l of succinic acid was added to a plating bath.

As shown in FIG. 26, a plurality of columnar crystals are formed in the CoFe alloy film.

In further experiments, succinic acid was added to a plating bath, and CoFe alloys composed of the compositions shown in Table 4 were formed.

TABLE 4

| | CoFe plated film containing succinic acid | | | | Film forming condition | | | |
|---|---|---|---|---|---|---|---|---|
| | | | | | Current | | | |
| Waf. No. | Succinic acid [g/l] | Fe ion [g/l] | Co ion [g/l] | Fe/Co | density [mA/cm²] | Duty ratio | pH | Temp [° C.] |
| Sample 1 | 0.001 | 1.00 | 0.52 | 1.92 | 25.7 | 0.25 | 2.3 | 30 |
| Sample 2 | 0.005 | 1.00 | 0.52 | 1.92 | 25.7 | 0.25 | 2.3 | 30 |
| Sample 3 | 0.01 | 1.00 | 0.52 | 1.92 | 25.7 | 0.25 | 2.3 | 30 |
| Sample 4 | 0.05 | 1.00 | 0.52 | 1.92 | 25.7 | 0.25 | 2.3 | 30 |
| Sample 5 | 0.1 | 1.00 | 0.52 | 1.92 | 25.7 | 0.25 | 2.3 | 30 |

The film forming conditions of the CoFe alloys of Samples 1 to 5 are shown above in Table 4, and the compositions and characteristics of the CoFe alloys formed by plating under the above-mentioned conditions are shown below in Table 5.

TABLE 5

| | CoFe plated film containing succinic acid | | | | Characteristics | | | | |
|---|---|---|---|---|---|---|---|---|---|
| | Composition | | Film | Specific | Surface rough- | | | | |
| Waf. No. | Fe [mass %] | Co [mass %] | stress σ [MPa] | resistance ρ [μΩ cm] | ness Ra [nm] | Hce [Oe] | Hch [Oe] | Hk [Oe] | Bs [T] |
| Sample 1 | 69.3 | 30.7 | 1500 | 29.4 | 1.0 | 22.8 | 10.2 | 10.7 | 2.20 |
| Sample 2 | 70.2 | 29.8 | 1621 | 32.2 | 0.9 | 23.3 | 8.0 | 12.6 | 2.36 |
| Sample 3 | 69.5 | 30.5 | 1714 | 33.1 | 1.1 | 25.2 | 9.2 | 34.0 | 2.35 |
| Sample 4 | 69.7 | 30.3 | 1577 | 34.3 | 0.8 | 23.6 | 10.1 | 20.8 | 2.34 |
| Sample 5 | 69.2 | 30.8 | 1396 | 49.0 | 1.2 | 24.1 | 8.0 | 7.5 | 2.33 |

As is clear from Table 5, the saturation magnetic flux density Bs of every sample is 2.2 T or more, and, with respect to the amount of Fe, every amount of Fe falls within the range of 50% to 85% by mass. With respect to each of the CoFe alloys of Samples 2 to 5, a high saturation magnetic flux density Bs exceeding 2.3 T was achieved.

With respect to the CoFe alloys of Samples 2 and 3, high saturation magnetic flux densities Bs of 2.35 T or more were achieved.

As described above, the CoFe alloy having a high saturation magnetic flux density Bs was obtained when succinic acid was added to the plating bath instead of malonic acid as well.

The soft magnetic film of the present invention described above in detail is a plated film composed of Co and Fe, and columnar crystals extending in the film thickness direction are provided.

In the present invention, columnar crystals extending in the film thickness direction are formed, and thereby, improvement in the surface roughness of the film surface and improvement in the corrosion resistance can be achieved. Furthermore, the saturation magnetic flux density Bs can also be improved by making the crystal fine and eliminating the need for adding the noble metal element.

Accordingly, in the CoFe alloy of the present invention, both of the corrosion resistance and the saturation magnetic flux density Bs can be improved, and specifically, the above-mentioned saturation magnetic flux density Bs can be increased to 2.35 T or more.

In the method for manufacturing a CoFe alloy of the present invention, malonic acid is added to the plating bath, and thereby, degradation of the plating bath can be reduced. Since crystals in the soft magnetic film formed by plating can be made fine, and deposition of $Fe^{3+}$ in the above-mentioned soft magnetic film can be reduced by addition of the above-mentioned malonic acid, the manufacturing method of the present invention can improve both of the corrosion resistance and the saturation magnetic flux density Bs of the above-mentioned soft magnetic film.

What is claimed is:

1. A plated magnetic film consisting essentially of Co and Fe, wherein the plated magnetic film comprises columnar crystals extending in a film thickness direction, wherein the columnar crystals consist essentially of a plurality of fine crystals having an average crystal particle diameter of 200 Å or less and have a body centered cubic (bcc) crystal structure, and wherein a plurality of the columnar crystals are provided adjacent to one another in a film surface direction with grain boundaries linearly extending in the film thickness direction along the plurality of fine crystals and separating the columnar crystals, and wherein a (110) plane of the columnar crystals exhibits a preferred orientation in a direction parallel to a film surface of the plated magnetic film.

2. The magnetic film according to claim 1, wherein a compositional ratio of Fe is 50% to 85% by weight.

3. The magnetic film according to claim 1, wherein a compositional ratio of Fe is 50% to 81.5% by weight.

4. The magnetic film according to claim 1, wherein a compositional ratio of the Fe is 60% to 72% by weight.

5. The magnetic film according to claim 1, wherein a center line average roughness Ra of a film surface of the plated magnetic film is 2.5 nm or less.

6. The magnetic film according to claim 1, wherein the plated magnetic film comprises a film having 60% to 90% by weight Fe and a coercive force (He) of no more than about 15 Oe.

7. The magnetic film according to claim 1, wherein the plated magnetic film comprises a film having 60% to 72% by weight Fe and a coercive force (He) of no more than about 10 Oe.

8. The magnetic film according to claim 1, wherein the plated magnetic film comprises a film having 60% to 72% by weight Fe and a film stress of no more than about 1000 MPa.

9. The magnetic film according to claim 1, wherein the plated magnetic film comprises a film having a specific resistance of at least about 20 μΩ·cm.

10. The magnetic film according to claim 1, wherein the magnetic film has a thickness in the range of from 0.3 to 0.5 μm.

11. A thin film magnetic head comprising a lower core layer, an upper core layer and a magnetic pole portion located between the lower core layer and the upper core layer, wherein the magnetic pole portion has a width dimension in a track-width direction less than that of the lower core layer and the upper core layer, wherein the magnetic pole portion comprises one of a) a lower magnetic pole layer adjacent the lower core layer, an upper magnetic pole layer adjacent the upper core layer and a gap layer located between the lower magnetic pole layer and the upper magnetic pole layer, or b) an upper magnetic pole layer adjacent the upper core layer and a gap layer located between the upper magnetic pole layer and the lower core layer, wherein one or both of the upper magnetic pole layer and the lower magnetic pole layer comprises a plated magnetic film consisting essentially of Co and Fe, wherein the plated magnetic film further comprises columnar crystals extending in a film thickness direction, wherein the columnar crystals consist essentially of a plurality of fine crystals having an average crystal particle diameter of 200 Å or less and have a body centered cubic (bcc) crystal structure, wherein a plurality of the columnar crystals are provided adjacent to one another in a film surface direction with grain boundaries linearly extending in the film thickness direction along the plurality of fine crystals and separating the columnar crystals, wherein a (110) plane of the columnar crystals exhibits a preferred orientation in a direction parallel to a film surface of the plated magnetic film, and wherein a center line average roughness (Ra) of the film surface of the plated magnetic film is 2.5 nm or less.

12. The thin film magnetic head of claim 11, wherein the plated magnetic film comprises an organic acid-plated magnetic film.

13. The thin film magnetic head of claim 12, wherein the organic acid comprises malonic acid.

14. The thin film magnetic head of claim 12, wherein the organic acid comprises one of oxalic acid, succinic acid, maleic acid, and tartaric acid.

15. The thin film magnetic head of claim 11, wherein a portion of the Fe in the plated magnetic film comprises Fe having a +2 oxidation state.

16. The thin film magnetic head of claim 11, wherein the plated magnetic film comprises a substantially sulfur-free, electro-plated magnetic film.

17. The thin film magnetic head of claim 11, wherein the magnetic pole portion comprises an upper magnetic pole layer adjacent the upper core layer and a gap layer located between the upper magnetic pole layer and the lower core layer, and wherein the gap layer comprises a NiP plated film.

18. A plated magnetic film comprising Co and Fe, the plated magnetic film comprising a compositional ratio of 50% to 85% Fe by weight and columnar crystals extending in a film thickness direction, wherein the columnar crystals have a body centered cubic crystal structure and consist essentially of a plurality of fine crystals having an average crystal particle diameter of 200 Å or less, wherein a center line average roughness of a film surface of the plated magnetic film is 1.5 nm or less, the coercive force of the plated magnetic film is 12 Oe or less, and the saturation magnetic flux density of the plated magnetic film is 2.25 T or more.

* * * * *